United States Patent
Blankenship et al.

(10) Patent No.: US 9,578,671 B2
(45) Date of Patent: Feb. 21, 2017

(54) ESTABLISHING MULTIPLE CONNECTIONS BETWEEN A USER EQUIPMENT AND WIRELESS ACCESS NETWORK NODES

(71) Applicant: RESEARCH IN MOTION LIMITED, Waterloo (CA)

(72) Inventors: Yufei Wu Blankenship, Kildeer, IL (US); Shiwei Gao, Nepean (CA); Hua Xu, Ottawa (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 463 days.

(21) Appl. No.: 13/837,819

(22) Filed: Mar. 15, 2013

(65) Prior Publication Data

US 2014/0269632 A1    Sep. 18, 2014

(51) Int. Cl.
| | |
|---|---|
| H04W 72/04 | (2009.01) |
| H04W 36/04 | (2009.01) |
| H04W 60/00 | (2009.01) |
| H04W 76/02 | (2009.01) |
| H04W 28/08 | (2009.01) |
| H04W 36/28 | (2009.01) |

(52) U.S. Cl.
CPC .......... *H04W 76/025* (2013.01); *H04W 28/08* (2013.01); *H04W 36/04* (2013.01); *H04W 36/28* (2013.01)

(58) Field of Classification Search
CPC ... H04W 76/02; H04W 76/025; H04W 36/28; H04W 36/04; H04W 28/08; H04W 12/02; H04W 40/02; H04L 67/2842; H04L 63/306

USPC ........................................................ 370/336
See application file for complete search history.

(56) References Cited

U.S. PATENT DOCUMENTS

| | | | | |
|---|---|---|---|---|
| 2008/0076392 | A1* | 3/2008 | Khetawat .............. | H04L 63/123 455/411 |
| 2008/0207170 | A1 | 8/2008 | Khetawat et al. | |
| 2008/0267146 | A1 | 10/2008 | Lewis | |
| 2008/0268833 | A1* | 10/2008 | Huang et al. ................. | 455/425 |

(Continued)

FOREIGN PATENT DOCUMENTS

| | | |
|---|---|---|
| EP | 2622901 B1 | 6/2014 |
| EP | 2753035 A2 | 7/2014 |

(Continued)

OTHER PUBLICATIONS

European Patent Office, Notification of Transmittal of the International Search Report and the Written Opinion of the International Searching Authority, or the Declaration for Int. Appl. No. PCT/US2014/021524 dated Jul. 25, 2014 (15 pages).

(Continued)

*Primary Examiner* — Steven H Nguyen
*Assistant Examiner* — Vanneilian Lalchinthang
(74) *Attorney, Agent, or Firm* — Trop Pruner & Hu, P.C.

(57) ABSTRACT

A control plane connection is established between a user equipment (UE) and a first wireless access network node. Signaling in the control plane connection is used for establishing a plurality of connections between the UE and corresponding additional plurality of wireless access network nodes, to communicate user plane data between the UE and the additional wireless access network nodes.

26 Claims, 10 Drawing Sheets

(56) References Cited

U.S. PATENT DOCUMENTS

| | | | |
|---|---|---|---|
| 2009/0052350 | A1 | 2/2009 | Chen et al. |
| 2009/0307556 | A1* | 12/2009 | Cai et al. .................... 714/748 |
| 2009/0310487 | A1 | 12/2009 | Eriksson |
| 2010/0182950 | A1 | 7/2010 | Sexton |
| 2010/0296487 | A1 | 11/2010 | Karaoguz et al. |
| 2010/0296497 | A1 | 11/2010 | Karaoguz et al. |
| 2010/0296498 | A1 | 11/2010 | Karaoguz et al. |
| 2010/0296499 | A1 | 11/2010 | Karaoguz et al. |
| 2010/0322227 | A1* | 12/2010 | Luo ............................. 370/345 |
| 2011/0105144 | A1* | 5/2011 | Siomina et al. ........... 455/456.1 |
| 2011/0158171 | A1* | 6/2011 | Centonza ............ H04L 12/2856 370/328 |
| 2011/0170506 | A1 | 7/2011 | Zisimopoulous et al. |
| 2011/0216712 | A1* | 9/2011 | Yang ..................... H04L 1/0025 370/329 |
| 2012/0002564 | A1 | 1/2012 | Sexton |
| 2012/0122424 | A1 | 5/2012 | Herscovici et al. |
| 2012/0252524 | A1 | 10/2012 | Gora et al. |
| 2012/0281640 | A1* | 11/2012 | Xu ........................ H04L 5/0048 370/329 |
| 2012/0322450 | A1 | 12/2012 | Karaoguz et al. |
| 2013/0023276 | A1* | 1/2013 | Du ......................... H04B 7/024 455/452.1 |
| 2013/0028180 | A1 | 1/2013 | Gao et al. |
| 2013/0137469 | A1 | 5/2013 | Schmidt et al. |
| 2013/0143569 | A1* | 6/2013 | Kapoor et al. ............... 455/436 |
| 2013/0165130 | A1* | 6/2013 | Wu ....................... H04W 36/08 455/444 |
| 2013/0225193 | A1 | 8/2013 | Lee et al. |
| 2014/0036664 | A1* | 2/2014 | Han ................... H04W 76/048 370/230 |
| 2014/0177840 | A1 | 6/2014 | Liu |
| 2014/0211756 | A1* | 7/2014 | Bontu .................. H04W 36/04 370/331 |
| 2014/0219248 | A1* | 8/2014 | Reddiboyana ...... H04W 76/025 370/331 |

FOREIGN PATENT DOCUMENTS

| | | |
|---|---|---|
| WO | 03013171 | 2/2003 |
| WO | 2008008964 | 1/2008 |
| WO | 2011137775 | 11/2011 |
| WO | 2012166969 | 12/2012 |

OTHER PUBLICATIONS

3GPP TSG-RAN WG2 Meeting #81bis, R2-131174, Chicago, Agenda Item: 7.2, Source: Renesas Mobile Europe, Title: Protocol architecture for dual connectivity, Document for: Discussion, Apr. 15-19, 2013 (8 pages).

3GPP TSG-RAN WG2 Meeting #81, R2-130563, St. Julian's, Malta, Agenda Item: 7.2, Source: Broadcom Corporation, Title: Some feasible scenarios for small cells with dual connectivity, Document for: Discussion and Decision, Jan. 28-Feb. 1, 2013 (6 pages).

3GPP TS 33.401 V8.4.0, Technical Specification, 3rd Generation Partnership Project; Technical Specification Group Services and System Aspects; 3GPP System Architecture Evolution (SAE): Security Architecture; (Release 8), Jun. 2009 (95 pages).

3GPP TR 33.821 V8.0.0, Technical Report, 3rd Generation Partnership Project; Technical Specification Group Services and System Aspects; Rationale and track of security decisions in Long Term Evolved (LTE) RAN/3GPP System Architecture Evolution (SAE) (Release 8), Mar. 2009 (137 pages).

3GPP TS 36.300 V10.3.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011 (197 pages).

3GPP TS 36.331 V11.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2012 (302 pages).

3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).

3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).

3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).

3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).

3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).

Han et al., Capacity Analysis of Generalized Distributed Wireless Communication System and Transmit Antenna Selection for Maximization of Average Capacity, IEEE 2004 (5 pages).

Shan-Yuan Hol, Data Fusion in a Relay Network, SIT 2008, Toronto, Canada, Jul. 6-11, 2008 (5 pages).

Vasken Genc et al., IEEE 802.16J Relay-Based Wireless Access Networks: An Overview, Oct. 2008 (8 pages).

Kerpez et al., IEEE Transactions on Vehicular Technology, vol. 45, No. 2, 265—A Radio Access System with Distributed Antennas, May 1996 (11 pages).

David Soldani et al., Radio Communications Series, Nokia Siemens Networks, Wireless Relays for Broadband Access, Mar. 2008 (9 pages).

[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).

Gao et al., U.S. Appl. No. 13/745,051 entitled Communicating Data Using a Local Wireless Access Network Node filed Jan. 18, 2013 (98 pages).

3GPP TSG RAN#57 RP-121418, Chicago, US, Sep. 4-7, 2012, Source: CMCC, Title: New Study Item Proposal: Scenarios and Requirements of LTE Small Cell Enhancements (6 pages).

3GPP TSG-RAN Meeting #58 RP-122032 Barcelona, Spain, Dec. 4-7, 2012 Source: Huawei, HiSilicon, CATR Title: New Study Item Proposal for Small Cell Enhancements for E-UTRA and E-UTRAN—Physical-layer Aspects (10 pages).

3GPP TSG-RAN Meeting#58 RP-122033 Barcelona, Spain, Dec. 4-7, 2012, Source: NTT DOCOMO, INC. Title: New Study Item Description: Small Cell enhancements for E-UTRA and E-UTRAN—Higher-layer aspects (5 pages).

Blankenship et al., U.S. Appl. No. 13/789,931 entitled "Sending Data Rate Information to a Wireless Access Network Node" filed Mar. 8, 2013 (41 pages).

The International Bureau of WIPO, International Preliminary Report on Patentability for PCT/US2014/021524 dated Sep. 24, 2015 (10 pages).

* cited by examiner

ESTABLISHING MULTIPLE CONNECTIONS BETWEEN A USER EQUIPMENT AND WIRELESS ACCESS NETWORK NODES

BACKGROUND

As the number of wireless user equipments (UEs) has increased, wireless access service providers are increasingly facing challenges in meeting capacity demands in regions where the density of users is relatively high. To address capacity issues, small cells have been developed. A small cell (or multiple small cells) can operate within a coverage area of a larger cell, referred to as a macro cell. A small cell has a coverage area that is smaller than the coverage area of the macro cell.

If small cells are deployed, then communications with UEs can be offloaded from the macro cell to the small cells. In this way, data communication capacity is increased to better meet data communication demands in regions of relatively high densities of UEs.

BRIEF DESCRIPTION OF THE DRAWINGS

Some embodiments are described with respect to the following figures.

DETAILED DESCRIPTION

Figure 1:
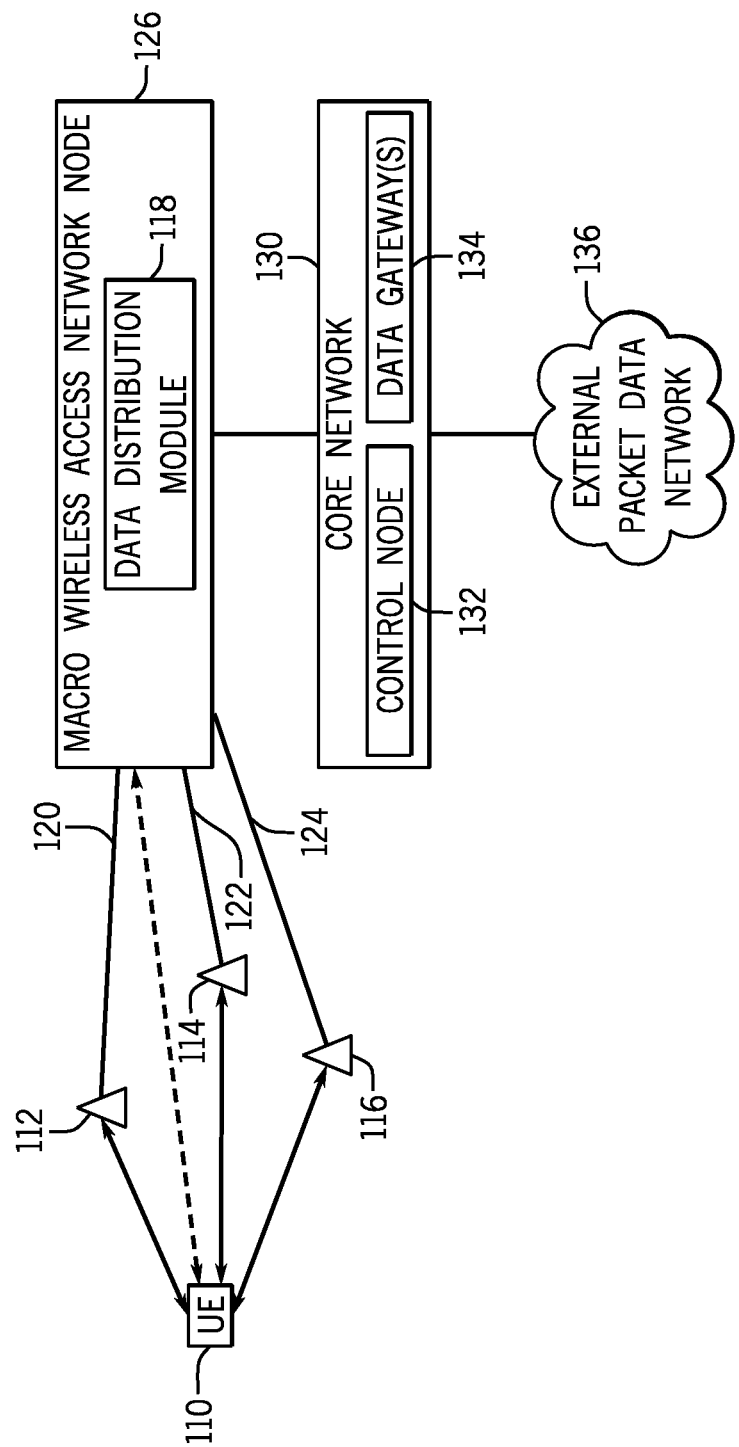
FIG. 1 is a schematic diagram of an example arrangement that includes a macro wireless access network node and local wireless access network nodes, in accordance with some implementations.

FIG. 1 illustrates an example arrangement that includes a number of network nodes that are part of a mobile communications network that supports wireless communications with user equipments (UEs). A node can refer to an active electronic device that is capable of sending, receiving, and forwarding information over a communication channel, and of performing designated tasks.

FIG. 1 shows a user equipment (UE) 110 that has established multiple connections (over respective air interfaces) with respective wireless access network nodes 112, 114, and 116. Examples of the UE 110 can include any of the following: a smartphone, a personal digital assistant, a notebook computer, a tablet computer, or any other device that is capable of wireless communications. Although just one UE 110 is depicted in FIG. 1, it is noted that multiple UEs may be present.

A wireless access network node is responsible for performing wireless transmissions and receptions with UEs. Each wireless access network node provides a coverage area within which UEs can communicate with the respective wireless access network node. A coverage area can refer to a region where mobile services can be provided by a network node to a target level.

In some implementations, the wireless access network nodes 112, 114, and 116 can be considered small cell wireless access network nodes (also referred to as local wireless access network nodes). A small cell corresponds to a coverage area that is generally smaller than a larger cell (referred to as a macro cell) that corresponds to a coverage area provided by a macro wireless access network node. A macro wireless access network node 126 is depicted in FIG. 1. In some examples, small cells provided by the local wireless access network nodes 112, 114, and 116 can be within the coverage area of the macro wireless access network node 126.

In the ensuing discussion, although reference is made to "local" wireless access network nodes and "macro" wireless access network nodes, it is noted that techniques or mechanisms according to some implementations can also be applied to other types of wireless access network nodes.

In addition to the connections established between the UE 110 and the local wireless access network nodes 112, 114, and 116, the UE 110 can also establish another connection with the macro wireless access network node 126. The connection between the UE 110 and the macro wireless access network node 126 includes a control plane connection. The connections between the UE 110 and the local wireless access network nodes 112, 114, and 116 can be used to communicate user plane data. Note also that the connection between the UE 110 and the macro wireless access network node 126 can also be used to communicate user plane data. Aggregating two or more local wireless access network nodes to support user plane data communication of the UE 110 can increase data throughput performance.

Although FIG. 1 shows the UE 110 being connected to three local wireless access network nodes, it is noted that in other examples, the UE 110 can be connected to a different number (e.g. two or less or greater than three) local wireless access network nodes.

Generally, a control plane connection is used to communicate control plane data, which can include control messages to perform various control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane data includes the traffic data (e.g. voice, user data, application data, etc.) to be communicated between the UE and a wireless access network node. User plane data can provide for transfer of bearer data, and can also include control data and/or signals between a wireless access network node and a UE associated with the communication of the bearer data, for performing flow control, error recovery, and so forth.

Generally, for the UE 110, the macro wireless access network node 126 provides wireless coverage (by communicating control plane data), while the bulk of the data throughput is provided by the local wireless access network nodes 112, 114, and 116 (although some portion of the data throughput may also be provided by the macro wireless access network node 126).

The local wireless access network nodes 112, 114, and 116 are also connected over respective backhaul links 120, 122, and 124 with the macro wireless access network node 126. In the example of FIG. 1, the data distribution module 118 is included in the macro wireless access network node 126, such as in a deployment scenario where multiple small cells are deployed in the coverage area of a macro cell. The local wireless access network nodes 112, 114, and 116 exchange payload data and control information with the macro eNB 126 via the backhaul links. Specifically, they receive user payload data from the data distribution module 118 within the macro eNB 126 via the backhaul links. In this case, the UE 110 has a control plane connection to the macro eNB 126 and may also have two or more connections to the local eNBs (LeNBs). A typical LeNB is a base stations deployed to cover a small cell.

In other examples, the data distribution module 118 can be included in one of the local wireless access network nodes 112, 114, and 116. This local wireless access network node is referred to as an anchor wireless access network node. As yet further examples, the data distribution module 118 can be included in a gateway. In further alternative examples, the data distribution module 118 can be provided in a node of a core network 130 of a mobile communications network.

The data distribution module 118 is responsible for distributing downlink data for the UE 110 across multiple connections established with the UE 110 according to some predefined or configured rules such as radio link condition and load conditions in each of the wireless access network nodes. The data distribution module 118 can also merge uplink data communicated over the multiple connections, for further transmission to the core network 130.

The core network 130 includes a control node 132 and one or more data gateways 134. The data gateway(s) 134 can be coupled to an external packet data network (PDN) 136, such as the Internet, a local area network (LAN), a wide area network (WAN), and so forth.

An issue associated with a UE that has multiple connectivities to local wireless access network nodes, is that frequent handover may occur as a UE moves across the relatively small coverage areas of the respective local wireless access network nodes. The frequent handover can result in increased signaling overhead. Moreover, radio link failure at a small cell may occur more frequently due to the relatively small coverage area of the small cell. In addition, if a backhaul link (e.g. 120, 122, or 124) to a small cell has relatively high latency (in other words, the backhaul link has a relatively slow data communication bandwidth), then handover and data offloading procedure may be too slow. In addition, at the edge of a coverage area of a small cell, the wireless link quality may be lower than that at the center of the small cell. Consequently, a user may experience uneven data throughput within a relatively short distance between the center of the small cell and the edge of the small cell.

In accordance with some implementations, to address the foregoing issues, a UE, such as the UE 110 of FIG. 1, can concurrently connect to multiple small cells for communicating user plane data, as well as concurrently connect to the macro wireless access network node 126 for a control plane connection between the UE 110 and the macro wireless access network node. The ability to concurrently connect to multiple small cells to allow communication of user plane data between the UE 110 and the multiple small cells can reduce at least some of the issues noted above. Note that the concurrent connections that a UE maintains can be logical in that the corresponding physical communication channels may or may not be active at the same time. In one example, the UE is equipped with multiple transceivers. Thus the UE is capable of maintaining multiple physical connections to the network nodes (such as macro eNBs and LeNBs) simultaneously, where one physical connection is maintained with each network node. In another example, the UE is equipped with one transceiver while it maintains multiple concurrent logical connections to the network nodes. Thus the UE maintains two or more concurrent logical connections by switching physical connections between the logical connections. The UE is physically connected to one network node at a time, and it switches the physical connections to the network nodes in a time division multiplexing (TDM) manner.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards.

Although reference is made to LTE in the ensuing discussion, it is noted that techniques or mechanisms according to some implementations can be applied to other wireless access technologies.

In an LTE network, a wireless access network node can be implemented as an enhanced Node B (eNB), which includes functionalities of a base station and base station controller. Thus, in an LTE network, a macro wireless access network node is referred to as a macro eNB. In an LTE network, local wireless access network nodes can be referred to as local eNBs (LeNBs).

In an LTE network, the control node 132 in the core network 130 can be implemented in a mobility management entity (MME). An MME is a control node for performing various control tasks associated with an LTE network. For example, the MME can perform idle mode UE tracking and paging, bearer activation and deactivation, selection of a serving gateway (discussed further below) when the UE initially attaches to the LTE network, handover of the UE between macro eNBs, authentication of a user, generation and allocation of a temporary identity to a UE, and so forth. In other examples, the MME can perform other or alternative tasks.

In an LTE network, the data gateway(s) 134 of the core network 130 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 136. The PDN-GW is the entry and egress point for data communicated between a UE in the LTE network and a network element coupled to the PDN 136. Note that there can be multiple PDNs and corresponding PDN-GWs. Moreover, there can be multiple MMEs and SGWs in the network, although for a given UE, the UE is connected to only one MME and one SGW at a time.

Multiple Connections at a Higher Layer

In accordance with some implementations, the connections established between the UE 110 and the local wireless access network nodes 112, 114, and 116 are upper layer connections. An upper layer connection refers to a connection that involves a protocol layer that is above the Medium Access Control (MAC) layer. In another alternative, an upper layer connection simply means the connection above the physical layer.

An upper layer connection can refer to a connection that is not just at the physical layer, but that also includes an independent MAC layer and layer(s) above the MAC layer for each connection. In other words, for each connection between the UE 110 and a wireless access network node, there is an upper layer entity in the UE and a respective peer upper layer entity in the wireless access network node. For example, for each connection, independent layer 1 control channel/transport channel/logic channel/radio bearers can be configured and operated on their own.

In some examples, multiple connections may be established when the UE 110 is located generally in coverage areas of a cluster of LeNBs, such as 112, 114, and 116 in FIG. 1, where the coverage areas of the cluster of LeNBs are within the coverage area of the macro eNB 126.

Multiple Upper Layer Connections Controlled by a Macro eNB

Figure 2:
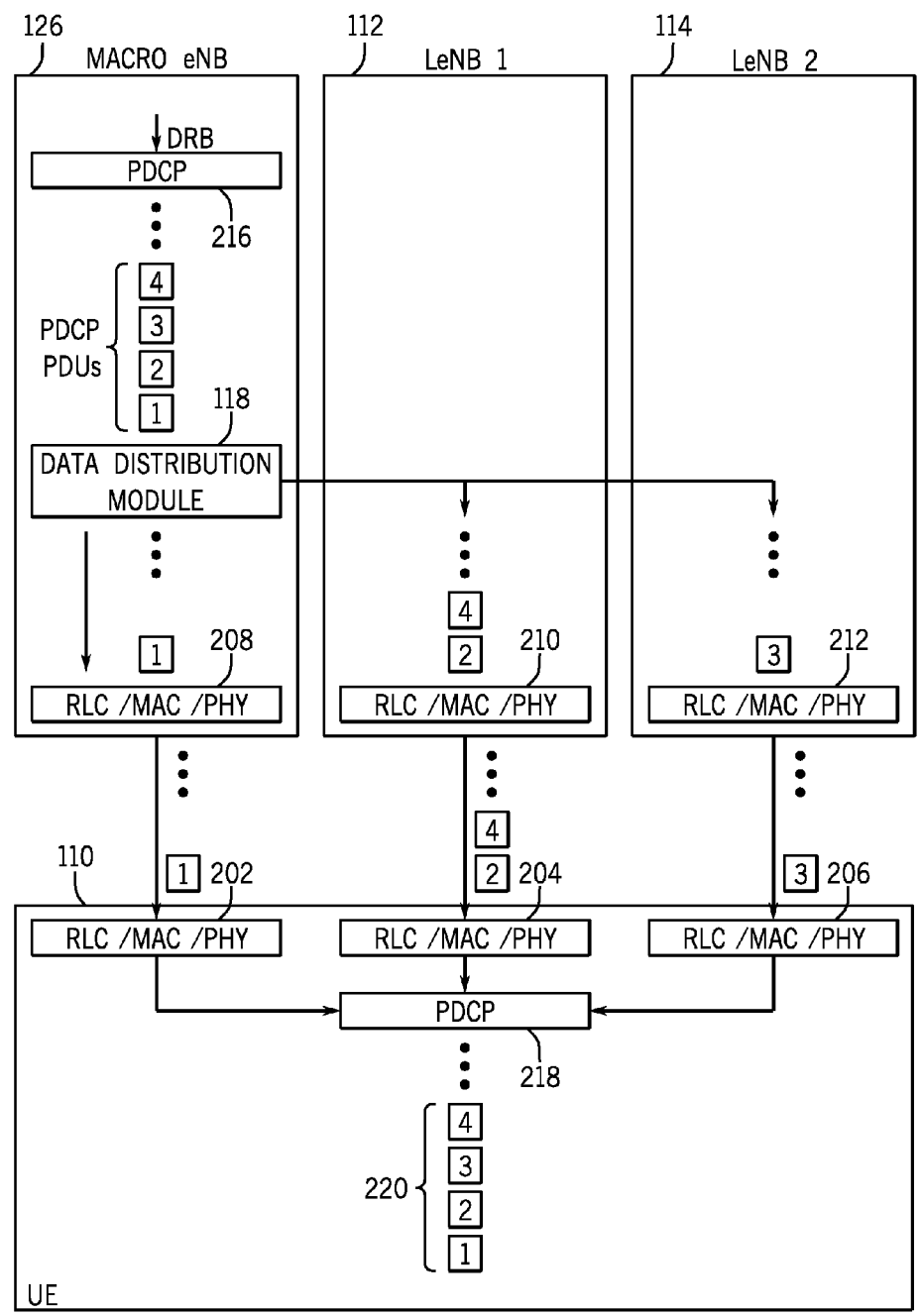
FIGS. 2 and 3 are schematic diagrams of distributing user plane data across multiple wireless access network nodes, according to some implementations.

FIG. 2 shows an example of upper layer connections established between the UE 110 and respective ones of the macro eNB 126, LeNB 112, and LeNB 114. In the example of FIG. 2, it is assumed that the UE 110 has established connections with just two small cells, in addition to the connection with the macro eNB 126.

The UE 110 includes three protocol stacks 202, 204, and 206, where each protocol stack includes a physical layer, a MAC layer above the physical layer, and a Radio Link Control (RLC) layer above the MAC layer. The RLC layer can provide at least some of the following example functionalities, as described in 3GPP TS 36.322, including: transfer of upper layer packet data units (PDUs); error correction, such as by using Automatic Repeat reQuest (ARQ); concatenation, segmentation, and reassembly of RLC service data units (SDUs); reordering of RLC data PDUs; and so forth.

Separate upper layer connections can be established between the protocol stacks 202, 204, and 206 of the UE 110 and respective protocol stacks 208, 210, and 212 of the macro eNB 126, LeNB 112, and LeNB 114.

As further shown in FIG. 2, the data distribution module 118 is provided in the macro eNB 126. It is assumed in FIG. 2 that the data distribution module 118 is provided at a Packet Data Convergence Protocol (PDCP) layer 216, which is above the RLC layer. If the data distribution module 118 is part of the PDCP layer 216, then the PDCP layer is considered an enhanced PDCP layer that provides data splitting and merging functionalities of the data distribution module 118. In other examples, the data distribution module 118 can be separate from the PDCP layer 216.

The PDCP layer 216 can provide at least some of the following functionalities in the user plane, as described in 3GPP TS 36.323, including: header compression and decompression; in-sequence delivery of upper layer packet data units (PDUs); duplicate detection of lower layer service data units (SDUs); retransmission of PDCP SDUs; and so forth.

In the downlink direction, the data distribution module 118 can split PDCP PDUs from the PDCP layer 216 into different logical channels that may map to different eNBs. In other words, the data distribution module 118 can divide the data after the PDCP layer 216 to each individual eNB. With the arrangement of FIG. 2, the data units (e.g. PDCP PDUs) of one data radio bearer (DRB) can be carried over different cells.

A data radio bearer (DRB) transports the packets of an Enhanced Packet Services (EPS) bearer between a UE and an eNB. An EPS bearer is established between the UE and the PDN-GW. There can be a one-to-one correspondence between a DRB and an EPS bearer.

In the example of FIG. 2, four PDCP PDUs 1, 2, 3, and 4 (downlink PDUs) are split by the data distribution module 118 among the macro eNB 126, LeNB 112, and LeNB 114. For example, the PDCP PDU 1 is provided to the protocol stack 208 of the macro eNB 126 for communication over the upper layer connection between the macro eNB 126 and the UE 110. Similarly, the PDCP PDUs 2 and 4 are provided to the protocol stack 210 in the LeNB 112, and the PDCP PDU 3 is provided to the protocol stack 212 of the LeNB 114, for communication over respective upper layer connections between the LeNBs 112 and 114 and the UE 110.

On the reception side, as shown in FIG. 2, a PDCP layer 218 in the UE 110 can combine and re-order the received PDCP PDUs into re-ordered PDCP PDUs 220.

Each eNB 126, 112, and 114 can configure its own MAC layer or RLC layer independently. Data rate allocation for the individual cells (including the macro cell and small cells) may depend on the average channel condition and cell loading of the respective cells. Therefore, the small cells may need to regularly report its status to the macro-cell. The average channel condition between the UE 110 and each LeNB can be reported to the macro eNB 126 by either the UE 110 or the LeNB.

Figure 3:
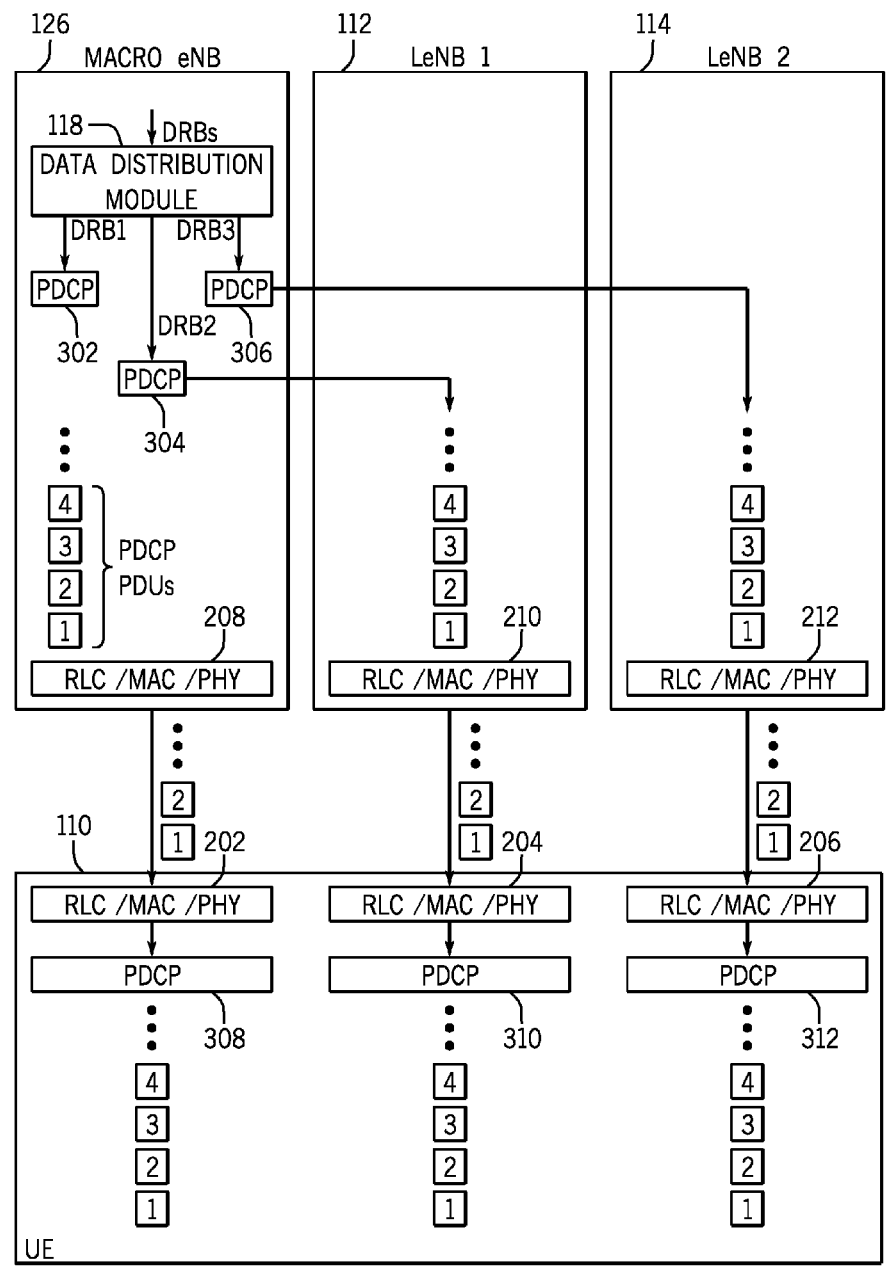

In alternative implementations, as shown in FIG. 3, the data distribution module 118 can be provided above the PDCP layer in the macro eNB 126. In such implementations, the splitting of data is at the bearer level—in other words, different bearers (e.g. DRBs) are provided to different eNBs for communication. However, the data units of a specific bearer are not split across eNBs; instead, all data units of a specific bearer are carried by the same eNB.

FIG. 3 shows three upper layer connections, also considered user plane connections since the splitting is at the bearer level. With implementations according to FIG. 3, the PDCP and RLC layers do not have to be modified to support data distribution.

However, to support this data distribution arrangement, multiple PDCP layers 302, 304, and 306 are provided in the macro eNB 126 and multiple PDCP layers 308, 310, and 312 are provided in the UE 110.

The data distribution module 118 can map different DRBs (e.g. DRB1, DRB2, and DRB3) to different PDCP layers 302, 304, and 306. For example, DRB1 is mapped to the PDCP layer 302, DRB2 is mapped to the PDCP layer 304, and DRB3 is mapped to the PDCP layer 306. PDCP PDUs from the PDCP layer 302 are provided to the protocol stack 208 in the macro eNB 126 for communication over the upper layer connection between the macro eNB 126 and the UE 110. Similarly, the PDCP PDUs from the PDCP layers 304 and 306 are provided to the protocol stacks 210 and 212 in the LeNBs 112 and 114, respectively, for communication over the corresponding upper layer connections between the LeNBs 112, 114 and the UE 110.

More generally, the data distribution provided by the data distribution module 118 of FIG. 1 can be (1) bearer based (where each bearer is associated with a respective upper layer connection), or (2) packet based (where packets of a bearer can be sent over more than one upper layer connection).

As noted above, the data distribution module 118 of FIG. 1 can be implemented in one of various ways. In a first option, the data distribution module 118 is implemented in the core network 130. In this case, the multiple connections between the UE 110 and respective eNBs (including the LeNBs) are visible to the core network 130.

In a second option, the data distribution module 118 is implemented in one of the eNBs. In this case, the multiple connections between the UE 110 and the LeNBs may be transparent to the core network 130, since the core network 130 communicates with the macro eNB 126, but does not communicate with the LeNBs. When this second option, there are further alternatives in terms of in which protocol layer the data distribution module 118 may be implemented. For example, as shown in FIG. 3, the data distribution module 118 can be provided above the PDCP layer, in which case PDCP SDUs are distributed by the data distribution module 118 to respective different PDCP layers. In another alternative, the data distribution module 118 can be provided at the PDCP layer, as shown in FIG. 2, in which case PDCP PDUs are distributed by the data distribution module 118.

As yet another alternative, the data distribution module 118 can be provided at the RLC layer, in which case RLC PDUs are distributed by the data distribution module 118. In this arrangement, an RLC layer in the macro eNB 126 can be connected to two or more MAC layers, where each MAC layer is in a different eNB. The hybrid automatic repeat request (HARQ) logic in the MAC layer can indicate failed transmissions to the RLC layer, to cause the RLC layer to perform retransmission without waiting for a negative acknowledgment (NACK) from the receiving RLC layer (in the receiving device). The MAC HARQ logic can reduce the packet error rate to a relatively low level. When RLC-level retransmission is to be performed, the scheduler at the macro eNB 126 can send the retransmitted RLC PDU to a new small cell. This arrangement does not rely on relatively low latency backhaul links, and packets can be more freely distributed to different small cells. Transmission of duplicated packets is also possible with this arrangement.

In a third option, instead of providing the data distribution module 118 in an eNB or the core network 130, the data distribution module 118 can instead be provided in a gateway. The LeNBs connect to the core network 130 via the gateway.

At the physical layer, the multiple connections may operate at the same or different frequencies. When operating multiple connections over different carrier frequencies, the UE 110 may send and/or receive data over the multiple connections simultaneously if a dedicated transceiver and the associated higher layer functions are available for each connection at the UE 110. Note that the ability to communicate data over multiple connections simultaneously is dependent on the capability of the UE 110, and how far the carrier frequencies are separated (if the carrier frequencies are not sufficiently separated, inter-carrier interference can prevent simultaneous data communications over the multiple connections).

The UE 110 may communicate data over the connections one at a time if a single transceiver is provided in the UE 110.

In a high density small cell deployment scenario, inter-cell interference may become an issue among small cells. In this case, it is possible that different carriers may be used in the neighboring small cells. For example, multiple carriers are allocated in a high frequency band for the small cells and adjacent small cells use different frequencies. Multiple connections can increase the data throughput for the UE 110 if the UE 110 can support multiple carriers. If configured properly, the UE 110 can receive data from multiple small cells simultaneously to achieve the data throughput benefit. On the uplink, if the UE is physically capable (e.g. two transceivers tuned to the two carrier frequencies of two small cells), the UE 110 may send data to each of the connected small cells, which achieves increased peak throughput.

When different carriers are not available for neighboring small cells, the multiple connections between the UE 110 and multiple LeNBs may use the same carrier frequency (although the carrier frequency with the macro eNB 126 can be different). In such implementations, the macro eNB 126 can configure the connections between the UE and LeNBs by using a time-division technique, in which data communication over the different connections occur at different times. For example, the macro eNB 126 can assign specific subframes that the UE 110 is to use for the connections with different small cells. A subframe refers to a segment of a radio frame that is a numbered time interval of certain duration used for data transmission on the radio carrier. Each segment can have a specified time length that is a portion of the overall time length of the radio frame and is the minimum time unit for data scheduling. In this manner, the UE 110 can have multiple upper layer connections to multiple small cells simultaneously, but the UE 110 physically receives data from and/or sends data to only one small cell at a given time.

When the same carrier frequency is used for connections to multiple LeNBs, interference may become an issue, such as interference of control signals. One example control signal that can be the subject of interference is a cell-specific reference signal (CRS), which can be transmitted in each small cell. A CRS can be used for downlink channel estimation for coherent demodulation/detection at the UE, and/or downlink channel quality measurements.

Several mechanisms can be utilized to manage CRS interference between adjacent small cells on the same frequency carrier. In some examples, the carriers deployed in the small cells can be the new carrier type (NCT). A new carrier type refers to a carrier that is of a type different from a traditional carrier, where the new carrier type can be implemented to provide for enhanced features, including enhanced spectral efficiency, improved energy efficiency, improved support for heterogeneous networks, and so forth.

In accordance with some implementations, an NCT carrier (of the same frequency) can be used for communications in the small cells. In the NCT carrier, the transmission of CRS is reduced in the time and/or frequency domain. As a result, instead of transmitting CRS constantly, the percentage of CRS transmission is reduced, which can reduce the inter-cell interference caused by CRS.

In alternative examples, the UE 110 can implement receiver algorithms to locate the CRS of neighbor small cells and to remove the inter-cell interference by using successive interference cancellation or another technique.

The inter-cell interference caused by user traffic data transmission can be avoided by transmitting over different physical resource blocks (PRBs) in different small cells in a fractional frequency reuse (FFR) fashion, or by using directional antenna techniques to steer data transmission away from UEs served by other small cells over the same PRBs.

The arrangement to support multiple connections as discussed above is that the UE 110 has a control plane connection to the macro eNB 126, and the UE has multiple user plane connections to LeNBs for communicating user plane data. The control plane remains anchored at the macro eNB 126. In another alternative, one user plane connection may exist between the macro cell and the UE to handle some particular services. For each user plane connection, individual radio bearers are maintained and coordinated by the macro eNB 126. For a multi-connection UE that has macrocell coverage, the offloading activity (offloading of data communication to a small cell) is a feature managed by the macro eNB 126, which is transparent to the core network 130. The small cell connections to the UE are not visible to the core network 130 to reduce signaling with the core network 130 associated with data communication over connections with small cells.

Note that, in some examples, a small cell can still act as a normal cell for a legacy UE that does not support multiple connections with small cells and a macro cell. A connection between a small cell and a legacy UE is visible to the core network 130.

The following describes procedures for adding and deleting a small cell connection. Note that the establishment and release of a small cell connection can be determined by a variety of factors. For example, if an existing connection has being experiencing strong interference, a new connection may be added so that the existing connection may be deleted later if the channel condition on the existing connection does not improve. In another example, a new connection may be added for load balancing purpose, so that the traffic load of the user can be shared between two (or more) small cell connections.

Figure 4:
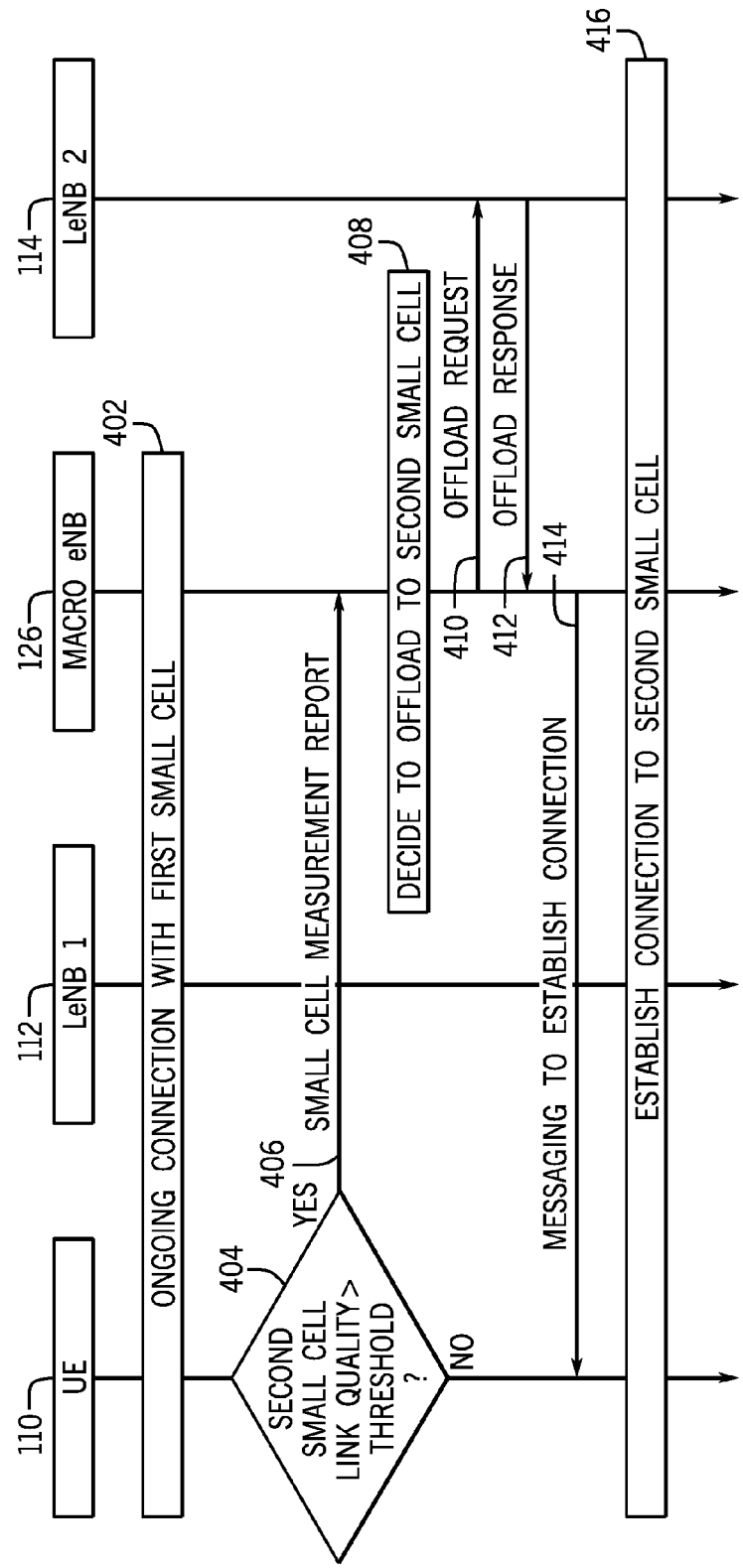
FIG. 4 is a message flow diagram of a process for adding a connection to a small cell, according to some implementations.

FIG. 4 shows an example message flow for adding a second small cell connection (between the UE 110 and LeNB 114), in addition to a first small cell connection (between the UE 110 and LeNB 112) that has already been established (at 402). Note that the UE 110 also has a connection with the macro eNB 126.

When the UE 110 moves within the coverage are of a second small cell (provided by LeNB 114), the UE 110 reports the channel measurement of the second small cell to the macro eNB 126. Configuration of the measurement and reporting can be provided by the network. For example, the macro eNB 126 can configure a certain measurement object for the UE to monitor the small cells on a certain carrier frequency. As shown in FIG. 4, if the UE 110 detects (at 404) that a small cell radio link quality (of the second small cell) is greater than a specified threshold, then the UE 110 sends (at 406) a small cell measurement report that contains measurement data to the macro eNB 126. The small cell measurement report can include an indication of a strength of a radio link with a given small cell (or with multiple small cells), and can identify the small cell (or small cells).

Based on the small cell measurement report from the UE 110, the macro eNB 104 can determine (at 408) whether traffic data offload is to be performed to the second small cell (provided by LeNB 114).

In the determination at 408, the macro eNB 126 can decide that the channel quality of the second small cell is sufficiently good to add a connection to the second small cell. This determination of channel quality can be performed using: (1) measurement of an uplink sounding reference signal (SRS) or another uplink channel by the second small cell, or (2) measurement of a downlink signal or channel, such as the channel state information reference signal (CSI-RS), by the UE 110.

If measurement of an uplink SRS is used, the macro eNB 126 can configure candidate small cells to perform SRS-based uplink channel measurement for the UE 110. The candidate small cells can be suggested by correlating the location information of the UE 110 and the location of the small cells, or based on the handover/offload history information of the UE 110.

The UE 110 can synchronize with the second small cell through a random access channel (RACH) process. RACH-related information together with SRS configuration can be provided by the second small cell to the UE 110. A report of the uplink channel quality can then be sent from the candidate small cell(s) to the macro eNB 126. The macro eNB 126 determines which small cell(s) should be added based on the received uplink channel quality report. This option can be used before the UE 110 is configured with downlink measurement.

On the other hand, if downlink measurement is used for the determining at 406, macro eNB 126 can configure the UE 110 to check the downlink channel quality of a group of small cells, and provide the relevant CSI-RS information (e.g. periodicity, pattern, etc.). The UE 110 can report the downlink measurement information relating to the group of small cells. The macro eNB 126 determines which small cell(s) should be added based on the received downlink channel quality report.

If the macro eNB 126 decides to offload traffic data to the second small cell, the macro eNB 126 sends (at 410) an Offload Request message to the LeNB 114 that provides the second small cell to which traffic data offload is to be performed. The Offload Request message can be sent over a link between the macro eNB 126 and the LeNB 114. The Offload Request message can include certain information, including information identifying the radio access bearer(s) to be offloaded, UE profile information (to identify the UE that is the subject of the data offload), quality-of-service (QoS) profile information (to describe the QoS associated with communications with a UE 110), and other information.

In response to the Offload Request, the LeNB 114 can send (at 412) an Offload Response to the macro eNB 126 in the link between the macro eNB 126 and the LeNB 114. The Offload Response can indicate whether the LeNB 114 has accepted or denied the Offload Request. Assuming that the Offload Response indicates that the LeNB 114 has accepted the Offload Request, the Offload Response can further identify the radio access bearer(s) that is (are) accepted by the LeNB 114. In response to the LeNB 114 accepting the Offload Request, the macro eNB 126 exchanges (at 414) control messaging with the UE 110. For example, this control messaging can instruct the UE 110 to start the establishment (at 416) of a second radio connection with the LeNB 114.

In some examples, the Offload Response can also include random access information, including a dedicated preamble. The random access information, including the dedicated preamble, can be used by the UE 110 to perform a random access procedure with the LeNB 114 to establish a radio connection with the LeNB 114.

In further examples, the Offload Response can also include system information, including certain information included in system information blocks (SIBs) and/or a master information block (MIB). The random access information and system information is sent back in the Offload Response to the macro eNB 126 to allow the macro eNB 126 to forward the random access information and system information to the UE 110 for use by the UE 110 for establishing a radio connection with the LeNB 114.

Figure 5:
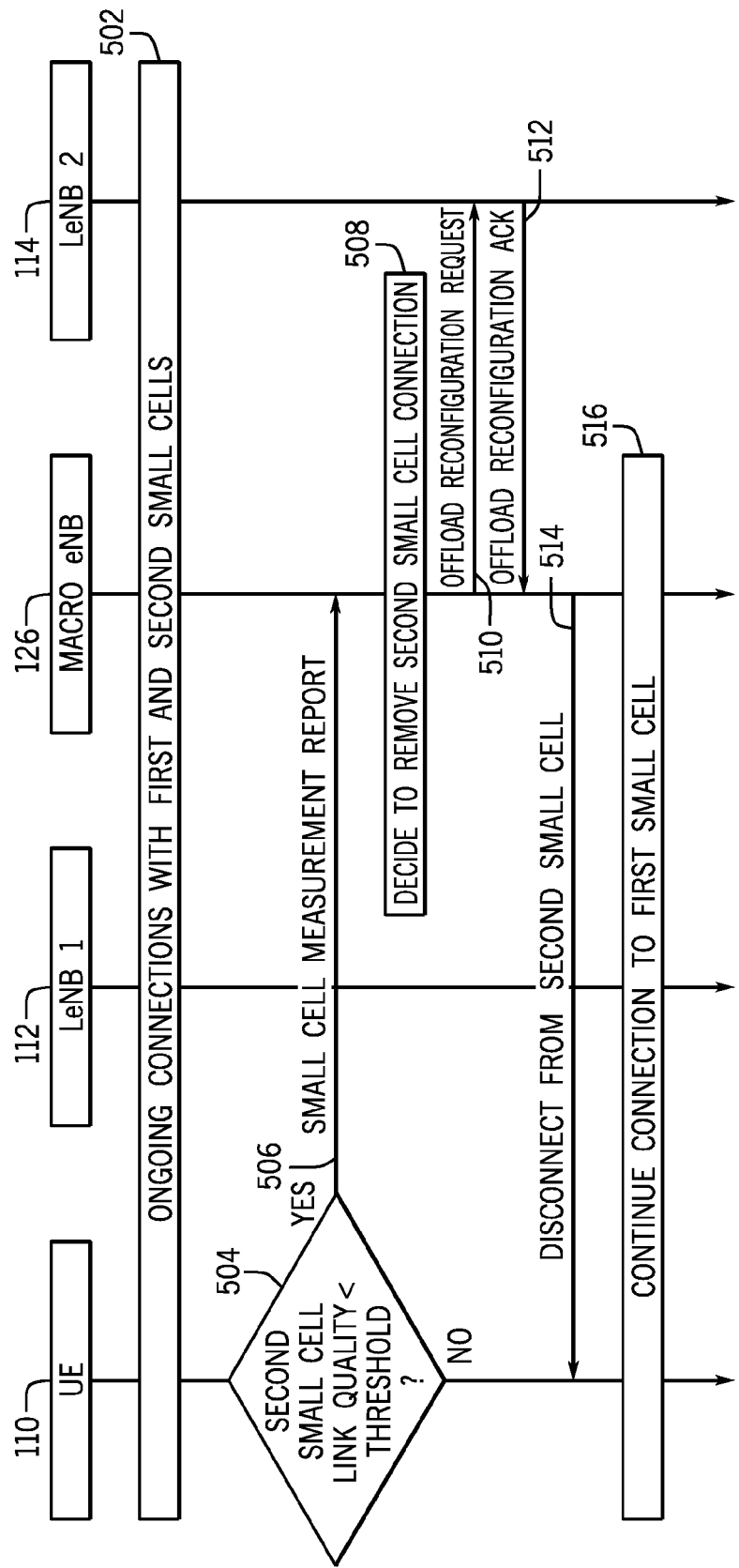
FIG. 5 is a message flow diagram of a process for deleting a connection to a small cell, according to some implementations.

FIG. 5 depicts an example for removing a connection between the UE 110 and the second small cell (provided by LeNB 114). It is assumed that the UE 110 has established (at 502) connections with both the first small cell (provided by LeNB 112) and the second small cell.

When the link to the second small cell fails due to mobility of the UE 110, the removal of the connection to the second small cell can be performed by removing the corresponding logical connection. No radio link recovery has to be performed. The connection to the second small cell can be removed for other reasons, such as interference avoidance or diminished traffic load.

If the UE 110 determines (at 504) that the radio link quality to the LeNB 114 has dropped below a specified threshold, the UE 110 sends (at 506) a small cell measurement report to the macro eNB 126 indicating that the radio link quality of the small cell has dropped below the specified threshold.

The macro eNB 126 can then perform a reconfiguration decision (at 508) to reconfigure the data offload by removing the connection to the second small cell. This decision can be made in one of a number ways. For example, the UE 110 can report to the macro eNB 126 that the radio link to the second small cell has failed after a timer expiration. Alternatively, the macro eNB 126 can make the decision to delete the connection to the second small cell based on a determination of the second small cell loading, a determination of the uplink or downlink data throughput, in response to a request of the second small cell, and so forth.

If the macro eNB 126 decides to remove the second small cell connection, the macro eNB 126 sends (at 510) an Offload Reconfiguration Request message to the LeNB 114, where the Offload Reconfiguration Request message identifies radio access bearer(s) to be removed. The Offload Reconfiguration Request message can remove all of the radio access bearers or just some of the radio access bearers that were previously offloaded from the macro eNB 126 to the LeNB 114.

In response to the Offload Reconfiguration Request message, the LeNB 114 sends (at 512) an Offload Reconfiguration Acknowledge message, to acknowledge the Offload Reconfiguration Request message.

The macro eNB 126 then signals (at 514) the UE to disconnect from the second small cell. The UE 110 disconnects from the second small cell. At this point, the LeNB 114 delivers any undelivered, stored uplink data packets to the macro eNB 126, and the macro eNB 126 can take action to deliver these uplink data packets to the core network 130.

Note that the UE continues (at 516) to be connected to the first small cell, so that the user plane connection is seamlessly maintained because of the connection to the first small cell.

Multiple Upper Layer Connections Controlled by the Core Network

The foregoing describes examples where the multiple upper layer connections with small cells are controlled by the macro eNB 126. In alternative implementations, the multiple upper layer connections can be controlled by a node in the core network 130. In such implementations the data distribution module 118 can be implemented in the core network 130, and multiple EPS bearers are mapped to respective small cells. In these implementations, the UE 110 still has just one control plane connection with the macro eNB 126, and potentially can have multiple user plane connections with different small cells. However, instead of performing user plane data splitting at the macro eNB 126 (as depicted in FIGS. 2 and 3, for example), the user plane data splitting can be performed at a node in the core network 130, such as at the SGW or PDN-GW, according to instructions from the macro eNB 126.

Figure 6:
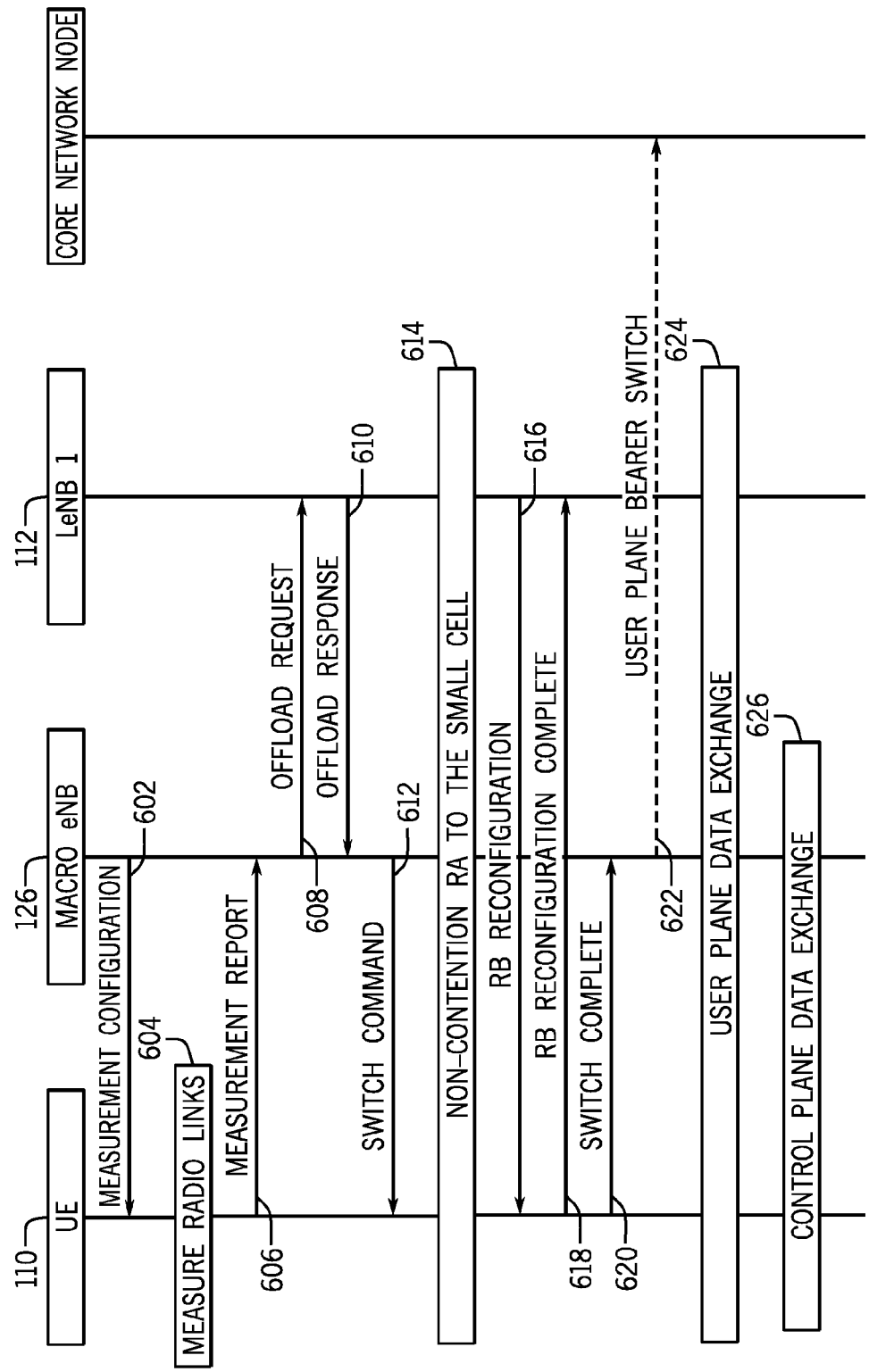
FIG. 6 is a message flow diagram of a process for adding a connection to a small cell, according to alternative implementations.

An example message flow is shown in FIG. 6. When the UE 110 first accesses the macro cell, after the random access procedure, the macro eNB 126 signals (at 602) an inter-frequency measurement configuration to the UE 110. The inter-frequency measurement configuration configures the UE 110 to perform (at 604) measurement of radio links to one or more small cells, at the carrier frequency (or frequencies) of the respective small cell(s).

Initially, the UE 110 has both a control plane connection and a user plane connection with the macro eNB 126. The UE 110 continues with the inter-frequency measurement and if a small cell with a qualified Reference Signal Received Power (RSRP) or a Reference Signal Received Quality (RSRQ) is detected, the UE 110 may trigger the sending (at 606) of a measurement report to the macro eNB 126. The macro eNB 126 may then send (at 608) an Offload Request to an LeNB (e.g. LeNB 112). If the LeNB 112 accepts the Offload Request, the LeNB 112 returns (at 610) an Offload Response accepting the Offload Request.

The macro eNB 126 can then send (at 612) a user plane Switch Command message to the UE 110, where the Switch Command may include the allocated dedicated preamble, the possible allocated radio bearer information, a temporary radio network temporary identifier (T-RNTI), and other relevant information. The UE 110 follows the instructions to perform a non-contention random access (at 614) to the small cell to achieve uplink timing alignment.

The LeNB 112 can then send (at 616) a Radio Bearer Reconfiguration message to the UE 110, to configure certain dedicated data radio bearers for the UE 110. The UE 110 can respond (at 618) with a Radio Bearer Reconfiguration Complete message.

After the data radio bearer setup, the UE 110 can send (at 620) a Switch Complete message to the macro eNB 126. After receiving the Switch Complete message, the macro eNB 126 can send (at 622) a user plane Bearer Switch message to a core network node (e.g. MME, SGW, or PDN-GW) to switch certain EPS bearers to the small cell provided by LeNB 112.

Note that a traditional user plane Bearer Switch message usually switches all bearers for a UE from one cell to another cell. In accordance with some implementations, the user plane Bearer Switch message sent (at 622) may include a new information element to identify specific EPS bearer(s) (less than all of the EPS bearers) that is (are) to be switched to the new small cell. After the core network node receives the user plane Bearer Switch message, the core network node can switch the identified EPS bearer(s) to the small cell provided by LeNB 112. The macro eNB 126 can control which EPS bearer(s) to switch to the small cell. For example, the macro eNB 126 may keep the voice-over-Internet Protocol (VoIP) bearer at the macro cell, while switching the web-browsing bearers to the small cell.

After the bearer switch is performed by the core network node, the UE 110 can perform user plane data exchange (at 624) with the LeNB 112, and can perform control plane data exchange (at 626) with the macro eNB 126.

If the UE 110 is capable of multiple user plane connections, UE 110 may transmit this capability to the macro eNB 126. In another alternative, the macro eNB may request the UE's capability and the UE responds with its multi-connection capability. The UE 110 may continue the inter-frequency measurement (similar to that performed at 604), and when another cell has satisfied the RSRP/RSRQ criteria, the UE 110 can trigger the sending of measurement reports to the macro eNB 126. If the macro eNB 126 determines that the UE is capable of multiple user plane connections, and multi-connections are to be used to improve the UE throughput and/or improve the overall system loading condition, the macro eNB 126 can send additional Offload Request message(s) to offload user plane data to additional small cell(s).

The remaining procedure to offload to the additional small cell(s) is similar to tasks 610-626 depicted in FIG. 6.

For the multiple user plane connections, if the signal strength of a small cell becomes weaker, the small cell can be removed from the connections. In this case, based on the measurement reports received from the UE, the macro eNB 126 may first send a user plane Bearer Switch command to the core network node to switch the relevant EPS bearer(s) from that small cell to other remaining small cells, or new eligible small cells. After the bearer switching is completed, the connection between the UE 110 and the weaker small cell may be terminated. If no eligible small cells are available, all the bearers may be re-assigned to the macro eNB 126 by the core network node. To satisfy the multi-connection function, some new measurement events may have to be defined. For example, the new measurement configuration may employ relative difference of RSRP/RSRQ between two small cells.

Multiple Connections at a Lower Layer

The foregoing describes establishing multiple upper layer connections between the UE 110 and respective small cells. The following describes establishing multiple lower layer connections between UE 110 and respective small cells. A "lower layer" refers to the physical layer. A lower layer connection can also be referred to as a "physical connection."

In a network node (e.g. the UE 110 or an eNB), the multiple physical connections are visible to the MAC layer, which is responsible for scheduling transport blocks to the available physical connections. On the other hand, the individual physical connections are not visible to layers above the MAC layer, including the RLC layer and PDCP layer. To the higher layers (RLC and above), there is only one connection to a small cell even though there are multiple physical connections to multiple small cells. Note that the one connection to a small cell visible to the higher layers is in addition to the connection to the macro eNB 126. With reference to the small cells, the UE 110 only maintains one logical connection but can support multiple physical connections.

Figure 7:
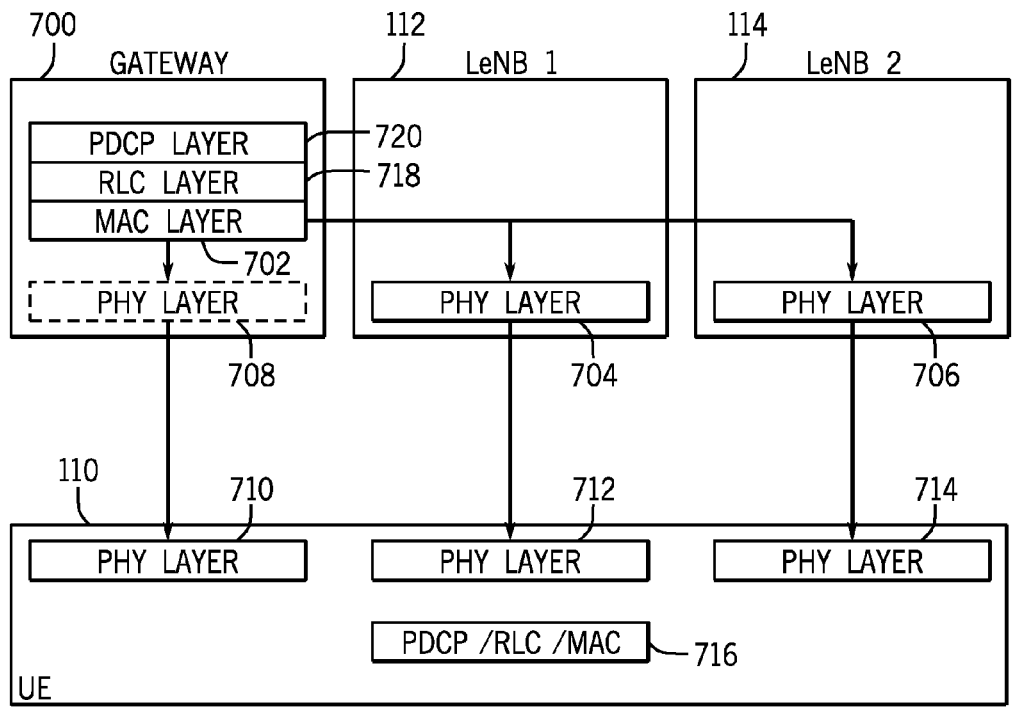
FIG. 7 is a schematic diagram of distributing user plane data across physical connections, according to some implementations.

In some implementations, as shown in FIG. 7, for a small cell cluster having LeNBs 112 and 114, assuming that a relatively low latency backhaul link is available to the LeNBs 112 and 114, a gateway 700 with just one MAC layer 702 can be provided. The gateway 700 can be a dedicated gateway for the small cell cluster, or the gateway 700 can be integrated with the macro eNB 126. More generally, the gateway 700 can be referred to as a controller. In further implementations, the controller can also be one of the LeNBs, where this LeNB is referred to as an anchor LeNB.

The MAC layer 702 can distribute user plane data to multiple physical layers 704 and 704 in the LeNBs 112 and 114. If the gateway 700 is part of the macro eNB 126, the user plane data can also be distributed to a physical layer 708 in the macro eNB 126.

The UE 110 includes physical layers 710, 712, and 714 for establishing respective physical connections to the physical layers 708, 704, and 706. There is just one protocol stack 716 above the physical layers 710, 712, and 714 in the UE 110. The protocol stack 716 includes a MAC layer, RLC layer, and a PDCP layer.

Similarly, an RLC layer 718 and PDCP layer 720 is provided above the MAC layer 702 in the gateway 700

With the arrangement of FIG. 7, one of multiple different transmission configurations can be coordinated by the gateway 700 for user plane data transmissions over physical connections between the UE 110 and corresponding LeNBs.

Figure 8:
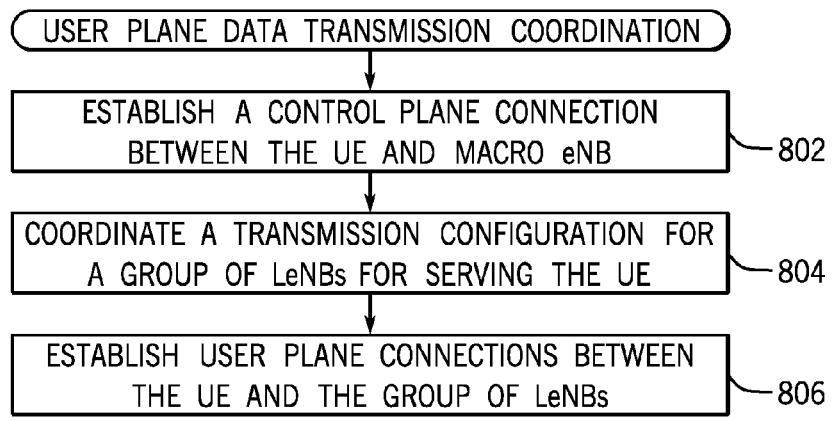
FIG. 8 is a flow diagram of a process of user plane data transmission coordination, in accordance with some implementations.

FIG. 8 is a flow diagram of a process that can be performed to coordinate user plane data transmissions over the physical connections. The process establishes (at 802) a control plane connection between the UE 110 and the macro eNB 126. The control plane connection establishment is performed based on a control message between the UE 110 and the macro eNB 126. The process coordinates (at 804) a transmission configuration for a group of LeNBs for serving the UE 110, where the group includes two or more LeNBs. The coordinating can be performed by the gateway 800 or by one of the LeNBs.

The transmission coordination refers to coordinating the LeNBs so that user plane data of the UE 110 can be communicated over the multiple physical connections established between the UE 110 and the LeNBs in the group. For example, coordinating the transmission configuration can include one or some combination of the following:

- coordinating transmission of reference signals by the LeNBs in the group, where reference signals can include demodulation reference signals (DRMS);
- assigning a virtual cell identifier to at least two LeNBs in the group, where the cell identifier can be used for generating reference signals such as DMRS;
- configuring the LeNBs in the group to send the same user plane data to the UE 110;
- configuring the LeNBs in the group to send different user plane data to the UE 110;
- configuring the LeNBs in the group to perform dynamic switching, where one LeNB in the group transmits to the UE 110 at any one time;
- configuring frequency resources for the LeNBs in the group;
- configuring time domain resources for the LeNBs in the group;
- configuring carrier aggregation that includes component carriers associated with respective LeNBs in the group; and
- other transmission configurations.

Next, the process establishes (at 806) user plane connections between the UE and the group of LeNBs, where the user plane connections are for communicating user plane data between the UE and the group of LeNBs. The user plane connections employ respective physical connections between the UE 110 and the LeNBs. The establishment of the user plane connections can be performed based on instructions to the UE 110 sent by the macro eNB 126.

Coordinated Multipoint Operation

If the LeNBs in the group operate on the same carrier frequency, then a coordinated multipoint (CoMP)-type of operation may be used for coordinating data communication over the multiple physical connections between the UE 110 and the LeNBs in the group, if the backhaul latency between LeNBs is relatively low.

With the CoMP-type operation, the multiple connections can be transparent to the UE 110, in the sense that UE 110 may not be aware of which small cell is transmitting data to the UE 110. The same demodulation reference signal (DMRS) (same port and sequence) is used even if the transmission is from different small cells. A downlink DMRS (sent by an LeNB) is specific to a particular UE, and is used to perform channel estimation for communication of data in a Physical Downlink Shared Channel (PDSCH).

A virtual cell identifier (ID) can be used to generate DMRS sequences for different small cells used for a PDSCH scheduled for the same UE. A similar mechanism can be used for communication of control information in an enhanced physical downlink control channel (EPDCCH), where the EPDCCH carries control information for supporting communication in the PDSCH. A virtual cell ID is UE specific (in other words, a virtual cell ID is unique to each UE). Alternatively, a group ID could be used for a group of small cells. The group ID can be used to generate DMRS sequences for the UE served by any small cell in the group, and therefore, making the transmission to the UE more transparent especially when UE is mobile and is moving from the coverage of one small cell to the other. Such a group of small cells sometime can also be referred as a cluster of small cells.

Figure 9A:
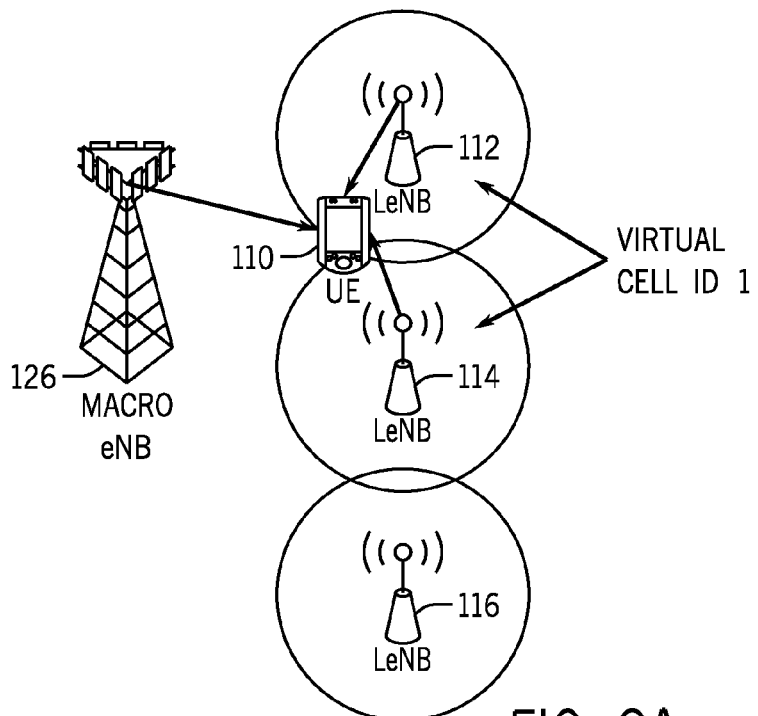
FIGS. 9A-9B are schematic diagrams illustrating transition of a user equipment across multiple small cells, according to some implementations.
Figure 9B:
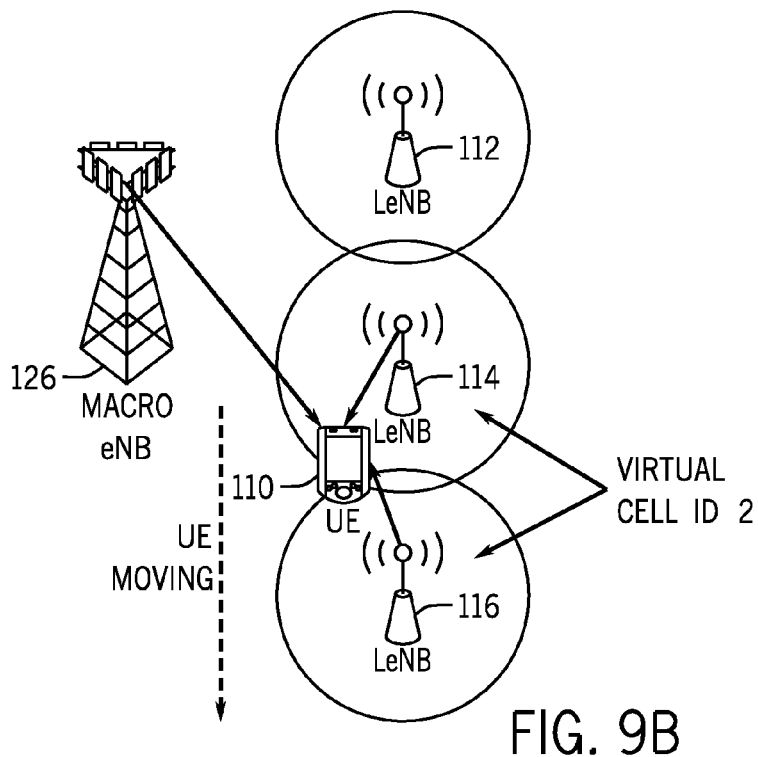

FIGS. 9A and 9B show an example in which different virtual cell IDs can be assigned to the UE 110 as the UE 110 moves to coverage areas of different small cells. In FIG. 9A, the UE 110 is at a boundary between the coverage areas of LeNB 112 and LeNB 114. At this point, the macro eNB 126 can configure the two neighboring small cells (provided by LeNBs 112 and 114) to jointly serve the UE 110 (to jointly communicate data with the UE 110). In FIG. 9A, the two small cells provided by the LeNBs 12 and 114 effectively behave as one small cell. The macro eNB 126 can assign a first virtual cell ID for use by the neighboring LeNBs 112 and 114. The neighboring LeNBs 112 and 114 use the first virtual cell ID to generate the DMRS to send to the UE 110. Note that the same DMRS is sent by both LeNBs 112 and 114.

FIG. 9B shows the UE 110 having moved to a boundary between neighboring small cells provided by LeNBs 114 and 116. At this point, the macro eNB 126 can update the UE-specific configuration (e.g. the serving LeNBs, the virtual cell ID, DMRS) to maintain the connection with the UE 110. The updated virtual cell ID is a second virtual cell ID used by the neighboring LeNBs 114 and 116 to generate the same DMRS sent by each of the LeNBs 114 and 116 to the UE 110. If LeNBs 112,114 and 116 belong to the same small cell group or cluster, the first virtual ID and the second virtual cell ID can be the same, and they are all the same as the group ID.

The data communication with the UE 110 during the transition of the UE 110 to different pairs of LeNBs can be transparent to the UE 110 in the sense the UE 110 is not aware which small cells are transmitting to the UE 110 in any particular subframe. This can reduce complexity associated with transitioning the UE between different pairs of LeNBs, as compared with normal handover behavior between cells.

The use of a virtual cell ID for generating a common DMRS to be sent by multiple neighboring LeNBs is an example of a transmission configuration performed in the coordinating at 804 in FIG. 8.

To achieve higher efficiency, synchronization between small cells can be performed. If small cells are synchronized (in time) with each other, a number of operations can be applied. For example, the LeNBs of a group can transmit the same data. This can be achieved by using a single, shared scheduler in the MAC layer (e.g. 802 in FIG. 8 or a MAC layer in an LeNB).

As another example, the LeNBs of the group can transmit different data to the UE 110 to increase data throughput by forming multiple input multiple output (MIMO) layers with distributed antennas at the LeNBs. MIMO layers are spatial layers to provide spatial separation between data streams sent between a UE and an eNB. A single, shared MAC scheduler can be used for the LeNBs in the group, where the MAC scheduler can be provided in the gateway 700 of FIG. 7 or in an LeNB. Inter-cell interference for a UE at the edge of a small cell can be mitigated by using precoding for two or more spatial layers. Precoding refers to coding applied to data sent in the different spatial layers to create orthogonal channels.

In implementations where the UE 110 has multiple transmit and receive antennas to support the multiple spatial layers with each LeNB, MIMO data throughput can be increased. For improved channel estimation, orthogonal DMRS ports can be transmitted from different small cells for different layers transmitted to the UE 110.

In another example, dynamic switching between different small cells can be performed. Dynamic switching refers to switching between different LeNBs for communicating data with the UE 110 as the UE 110 moves to different coverage areas of the LeNBs. Transmission according to dynamic switching can be transparent to the UE 110 in the sense that same DMRS for the PDSCH and EPDCCH can be transmitted from different cells if the same virtual cell ID is assigned, as discussed above. However, the UE 110 may still have to be made aware of dynamic information such as information relating to rate matching and quasi co-location of antenna ports; such information can be signaled to the UE 110 in a downlink grant message. The downlink grant message in this case can be transmitted from the macro eNB 126 if the control plane and user plane connections are split between the macro eNB 126 and one or more LeNBs. The data rate information relates to a rate of data communication, and is used by the UE 110 to perform decoding of received data. The quasi co-location information of antenna ports relates to whether antenna ports are quasi co-located or not, which can be used by the UE to improve channel estimation performance.

In a further example, dynamic blanking transmission can be used for reducing interference among small cells. Dynamic blanking transmission refer to among a group of LeNBs, one LeNB transmits at a time, while the remaining (non-transmitting) LeNBs remain silent (in other words, the remaining LeNBs do not transmit data).

The foregoing operations relating to transmitting the same data by LeNBs in a group, transmitting different data by LeNBs in a group, performing dynamic switching, and providing dynamic blanking transmission are examples of transmission configurations that can be coordinated at 804 in FIG. 8.

The above-mentioned operations of performing joint transmission of the same data and dynamic switching between small cells can be used for UE transition among cells as the UE 110 moves from one small cell to another small cell. For example if the UE 110 is at a cell edge or in joint coverage of two small cells, multiple small cells can transmit jointly the same data to the UE. When the UE 110 is moving from one small cell to another small cell, the transmission can dynamically switch from one small cell to another small cell—for example, the dynamic switching can involve switching from transmission by a first small cell in a first subframe to transmission by a second small cell in a second subframe.

The impact to the UE 110 can be reduced by assigning a UE-specific virtual cell ID to the UE 110, such that each small cell involved in the transition can use this virtual cell ID to generate UE-specific DMRS sequences for this particular UE for its PDSCH transmission. The UE therefore 110 does not have to use cell-specific DMRS sequences, which simplifies the cell transition process. In some cases, the transition process may not be completely transparent to the UE 110 due to differences in data rate matching in different small cells (e.g. due to different cell-specific reference signal positions and use of different regions in the PDCCH). Such differences however can be removed if an NCT carrier is used by the small cells. For example, if small cells support carrier aggregation, a legacy carrier and a number of NCT carriers can be configured. If the NCT carrier does not transmit the cell-specific reference signals and the PDCCH, the transition between small cells on NCT carriers can be completely transparent to the UE 110 because the same data rate matching can be applied to the NCT carrier among different small cells.

In some implementations, joint transmission and dynamic switching operations as discussed above assume full synchronization among LeNBs. In some cases, this assumption may not be true if the backhaul link between small cells has a relatively high latency. However, even in such implementations, some level of synchronization may still be achieved among LeNBs. For example, the LeNB can still be synchronized in the time domain at the symbol level (within a cyclic prefix of an orthogonal frequency-divisional multiplexing (OFDM) symbol). Such synchronization may be adequate to support some CoMP-type operations. For example, dynamic switching between small cells may still be supported. The joint transmission of data (same data or different data) may also work if coherent combining at the receiver is not used.

Figure 10:
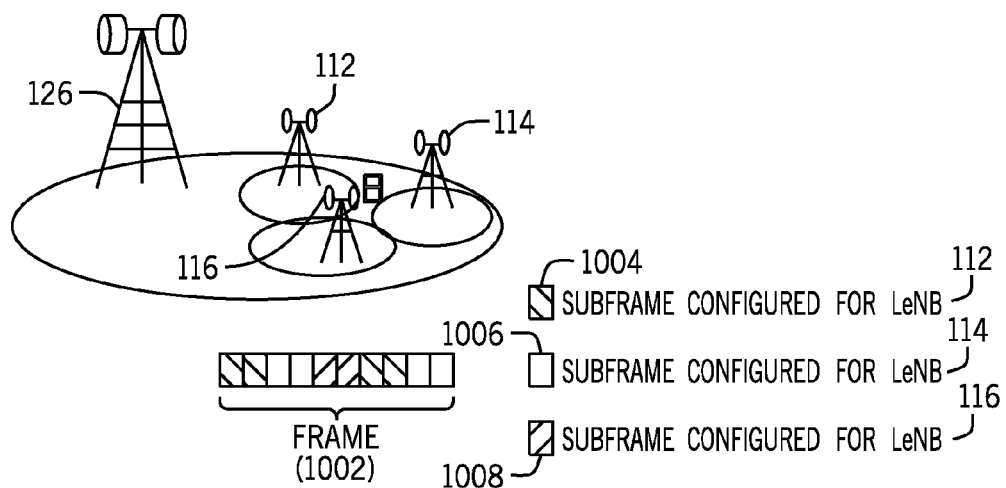
FIG. 10 is a schematic diagram illustrating assignment of subframes for different small cells, according to some implementations.

In alternative implementations, the multiple connections with LeNBs may not be transparent to the UE 110, in which case the UE 110 would know which LeNB is transmitting to the UE 110. In such implementations, the DMRS from the different small cells can be different. In these implementations, different sets of subframes can be configured for different small cells to transmit to the UE in a time-division multiplexing manner, as shown in FIG. 10. As different sets of subframes can be configured for different small cells ahead of time, that can overcome some issues brought by the backhaul with high latency. For example, the scheduler can schedule data to the UE and send them through a backhaul link to the small cell ahead of time. The small cell can then transmit the data to the UE in a configured specific subframe. The downlink grant for such data transmission can be transmitted from the macro-cell (or another LeNB) in the same subframe that the data is transmitted, which makes the control and data transmission look the same to the UE as the case with ideal backhaul. Such operation may be only applicable to non-delay sensitive data transmission.

FIG. 10 shows a radio frame 1002 that is divided into three sets of subframes. A first set of subframes as indicated by pattern 1004 is assigned to LeNB 112. A second set of subframes as indicated by pattern 1006, is assigned to LeNB 114. A third set of subframes as indicated by pattern 1008 is assigned to LeNB 116.

In this time-division multiplexed arrangement of subframes, when one small LeNB is transmitting to the UE 110, the other LeNBs either avoid transmitting any data over the same physical resource blocks (PRBs), or transmit in a different spatial direction using MIMO or beamforming (BF) techniques. The configuration of subframes can be signaled to the UE 110 semi-statically (or the configuration of subframes can stay static until the configuration is changed). The configuration can depend on the loading of each small cell as well as UE mobility. For example, if a first small cell has more data to schedule to the UE 110 while a second small cell has less data to schedule to the UE 110, then the first small cell can be configured with more subframes to transmit to the UE 110, while the second small cell can be configured with fewer subframes.

In another example, if the UE 110 is moving slowly across coverage areas of a number of small cells, the number of subframes that can be configured for each small cell in the moving path of the UE 110 can change depend on the proximity of the UE 110. Since the configuration of subframes is semi-statically assigned, while data traffic to the UE 110 is dynamic, then it may be possible that a particular LeNB may not have data traffic to send to the UE 110 in a given subframe configured for the particular LeNB. In this case, UE 110 can simply check the control channel transmitted in that subframe (which can be transmitted from the macro eNB 126 or from the particular LeNB) to see if the UE 110 does have PDSCH scheduled for it or not. The configuration of subframes can be signaled by the macro eNB 126 or one of the LeNBs.

In general, different types of data can be handled differently if non ideal backhaul is employed. For those delay sensitive data such as voice, they can be transmitted from the macro eNB or one of the LeNBs which has an ideal backhaul link. For another type of data which is less delay sensitive, such as web browsing, the data can be routed to the small cell with a non-ideal backhaul link. If the same DMRS can be transmitted from different small cells and CRS is not transmitted (such as on NCT), then different subframes may not have to be configured for different small cells. The scheduler can simply dispatch the data to one or more appropriate small cells which may have radio coverage of the UE. After the small cells receive the data, the macro eNB or one of the LeNBs can transmit a downlink grant for the data transmission at the same subframe as the LeNBs transmitting the data to the UE, thus making the transmission transparent to the UE.

Carrier Aggregation Operation

The CoMP-type operation discussed above assumes that different small cells use the same carrier frequency to communicate with the UE 110. In alternative implementations, multiple small cells can operate on different carrier frequencies, and the UE 110 supports the multiple frequencies.

For purposes of downlink communication, each small cell can be viewed as a component carrier of a carrier aggregation. A carrier aggregation is made up of multiple component carriers, which can be used for communicating data with the UE 110. In the context of multiple small cells that can support multiple carrier frequencies, each of the small cells can communicate data with the UE 110 using a respective different carrier frequency. The UE 110 can monitor the (E)PDCCH for grants corresponding to PDSCHs on different carrier frequencies. The downlink throughput is improved since a UE is served by multiple cells (multiple component carriers). Carrier aggregation may rely on use of a relatively low latency backhaul link between small cells. In such implementations, adding or removing a small cell for communicating with the UE 110 is akin to activating or deactivating a component carrier of a carrier aggregation.

Figure 11A:
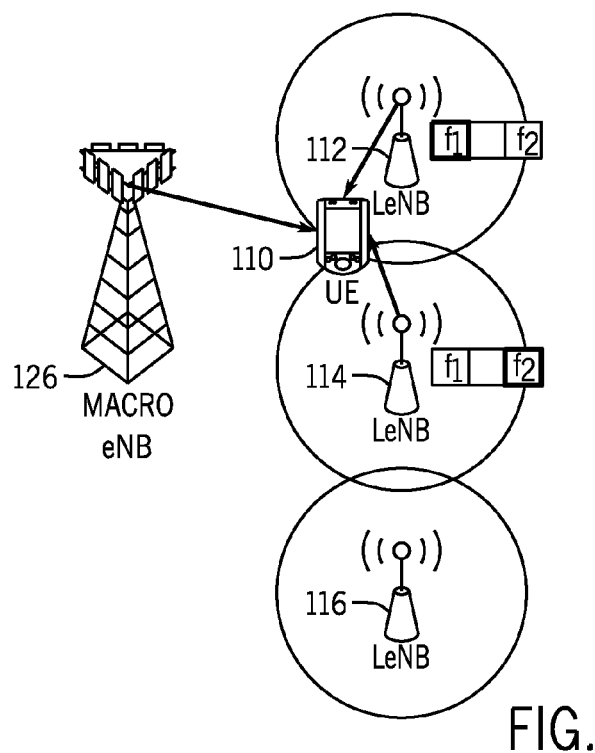
FIGS. 11A-11B are schematic diagrams illustrating transition of a user equipment across multiple small cells, according to alternative implementations.
Figure 11B:
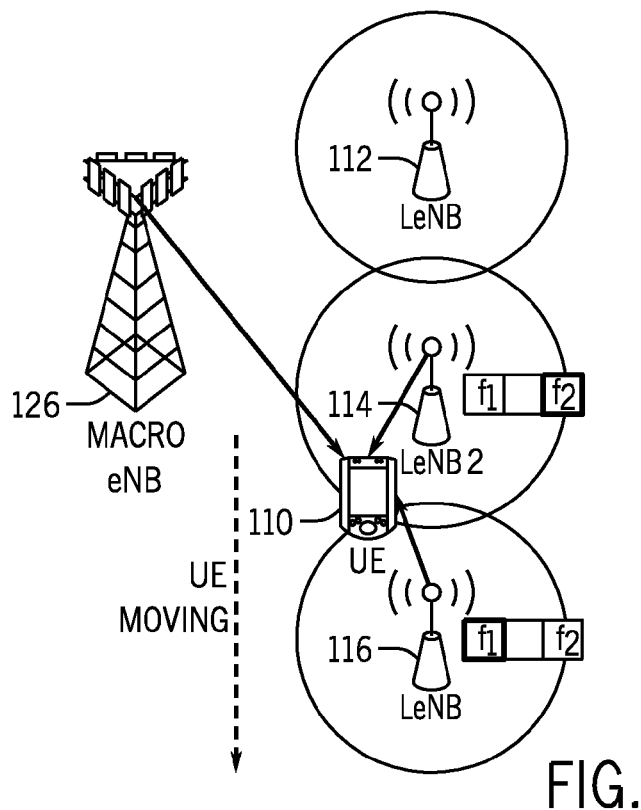

In an example depicted in FIGS. 11A and 11B, it is assumed that each LeNB and the UE 110 is able to support two carrier frequencies f1 and f2. While in the coverage area of LeNB 112, the UE 110 communicates using carrier frequency f1. As the UE 110 moves from LeNB 112 to LeNB 114, the UE 110 can maintain the connection to LeNB 114 on carrier frequency f2, while deactivating the connection to LeNB 112 on carrier frequency f1 when UE moves away from LeNB 112. In addition, as the UE 110 moves from LeNB 114 to LeNB 116, the UE 110 can activate the connection to LeNB 116 on carrier frequency f1 while deactivating the connection to LeNB 114 as the UE 110 moves away from LeNB 114.

In implementations where the backhaul links between small cells has relatively high latency, which can mean that the latency is in the range of a few subframes to a few frames, the small cells may not be viewed as component carriers of a carrier aggregation according to traditional carrier aggregation definitions. However, if the backhaul latency can be accommodated (such as by scheduling ahead of time to accommodate for the latency), and the LeNBs and macro eNB 126 are time synchronized at least in the time domain, a modified form of carrier aggregation can still be applied. With the modified carrier aggregation, the small cells can still be viewed as component carriers of a macro cell. Activation/deactivation of the component carriers via MAC messaging can be arranged ahead of time to take into account of the backhaul latency. Due to the backhaul latency, inter-carrier scheduling is performed where the physical control channel and the related physical data control information are transmitted over the same carrier or on co-located carriers (e.g. two carriers that belong to the same timing advance group (TAG)). A timing advance group can refer to a group of serving cells (which are available to serve a given UE) that use the same timing reference cell (the cell in the timing advance group that is used by the UE to derive timing information) and the same timing advance value. A timing advance value corresponds to a length of time a signal takes to reach an eNB from the UE. The timing advance value is used to compensate for round trip time, propagation delay of signals that travel from the eNB to the UE, and from the UE to the eNB.

If each small cell can support multiple carrier frequencies, that can enhance the carrier aggregation supported. In such an arrangement, the component carriers of a macro cell can include small cells in its coverage, plus different carriers supported by each small cell. A carrier aggregation can involve at least one component carrier of multiple small cells. Alternatively, a carrier aggregation can include the multiple component carriers supported by one small cell.

A carrier aggregation in such implementations can thus be considered to include two types of component carriers. A first type of component carriers are provided by different small cells. A second type of component carriers are provided by different carrier frequencies supported by each small cell.

With carrier aggregation, a "cell" does not refer just to the coverage area provided by a given eNB. A cell refers to a combination of downlink and optionally uplink resources. With carrier aggregation, a "cell" can refer generally to a coverage area provided by an eNB on a respective component carrier. If an LeNB supports two carrier frequencies, then the LeNB can support two cells, one on each of the two carrier frequencies. A "cell" corresponding to a coverage area of an LeNB relates to a spatial area of the LeNB. On the other hand, a "cell" corresponding to a carrier frequency of an LeNB relates to a different frequency bandwidth of the carrier frequency.

To distinguish between the different types of cells for carrier aggregation, different identifiers (in the form of indexes) can be used.

The distinction allows for proper behavior of the UE 110. For example, if cells configured for the UE 110 are based on different carriers, then the UE 110 has to monitor and receive signals (e.g. (DMRS, CSI-RS, PDCCH/EPDCCH, etc.) on different carriers (by performing radio frequency tuning). On the other hand, if cells configured for the UE 110 are based on different coverage areas of the LeNBs, then the UE 110 has to monitor and receive signals assuming they are from different small cells.

Two types of indexes can be used. A first index can be a small cell index to identify an LeNB. A second index can be a carrier index to identify a carrier of an LeNB. The activation or deactivation of a "cell" can be signaled from the macro eNB 126, a gateway, or an anchor LeNB for a cluster of LeNBs. The activation/deactivation of a "cell" can be based on various factors, such as the traffic loading situations. In one alternative, when the traffic is higher in an area, if a small cell has multiple carriers, all the carriers can be enabled for the purpose of throughput increase of the small cell. When the traffic is low in the area, the small cell can disable some of the carriers and may only keep one or a few carriers to maintain basic operations. This can be done by the small cell itself. In the extreme case, the small cell may decide to go to a sleep mode and shut down its TX/RX completely, or only shut down the TX or RX. In this case, the small cell can send a request to macro eNB or an anchoring small cell, and the macro eNB and the anchoring small cell can make proper arrangements such as switching the UEs associating with the small cell to other small cells and may send the approval message back to the small cell. In this case, the small cell may completely go to a sleep mode to save energy.

Multiple connection can be configured by configuring different cells (including different LeNBs or different carriers) with different subframes in a time-division multiplexed manner. In this scheme, the UE with one radio transceiver may work in a multi-frequency environment. However, the guard time may have to be provided for carrier switching at the beginning and at the end of communication duration with a certain carrier. The UE with multiple radio transceivers may work without guard time. Alternatively, the multiple connections can be achieved in a more transparent way, similar to the CoMP-type operations discussed above. For example, a carrier can be configured to the UE 110, and multiple connections to the UE 11 (from different LeNBs) can be more transparent. Alternatively, the UE 110 can be configured with more than one carrier and the UE 110 can receive control signals from the macro eNB 108 or an anchor LeNB on one carrier, which can direct the UE 110 to the LeNB and the carrier to receive data transmitted in PDSCH for the UE 110 from other carriers.

In a carrier aggregation arrangement that can employ either multiple LeNBs and/or multiple carriers, the small cell indexes or carrier indexes discussed above can be used to perform cross-carrier or cross-cell scheduling. In the case to support cross carrier scheduling, both indexes may have to be provided in the PDCCH delivered to the UE. Over the X2 interface, the data PDU should also be marked with the index and transmitted on the right carrier with the right subframe. Synchronization may be preferred. Pre-scheduling may be used here to schedule the data beforehand so certain delay over the backhaul is tolerable.

The schedulers for performing the scheduling can be independent for different small cells. As a result, the UE 110 can provide acknowledgments and negative acknowledgements independently for the different cells. If the cells are sufficiently synchronized (although loosely coordinated from a scheduler viewpoint), the acknowledgments and negative acknowledgements can be provided using one physical uplink control channel (PUCCH) or physical uplink shared channel (PUSCH). In one alternative, the acknowledgement and negative acknowledgment may be delivered to the macro eNB or the anchor eNB if ideal backhaul is provided. However, the loosely coordinated scenario may make it difficult to jointly manage PUCCH and PUSCH, since the small cells may not know when PUSCH will be transmitted for the another small cell. A more straightforward approach may be to assume that the UE transmits a PUCCH (or PUSCH carrying CSI) for each carrier.

CONCLUSION

By using techniques or mechanisms according to some implementations, more robust mobility is supported when a UE moves between small cells. A second small cell is established in anticipation of the UE moving towards the second small cell. In some cases, the UE does not have to establish simultaneous data connections to two small cells. The second small cell may only be informed about an approaching UE and be ready to accept the UE, such as by obtaining basic preparation information including UE context information and so forth.

Increased cell edge throughput can be achieved when a UE is located at the small cell edge. Small cells do not have to have low latency backhaul links between them. This is especially useful when the two neighboring small cells are deployed over two different carrier frequencies.

Increased uplink communication robustness may be achieved. Reordering of uplink packets can be done at the macro eNB. Uplink packets are received as long as one small cell received the uplink packets correctly. Also, uplink and downlink connections can be provided using two different small cells.

Figure 12:
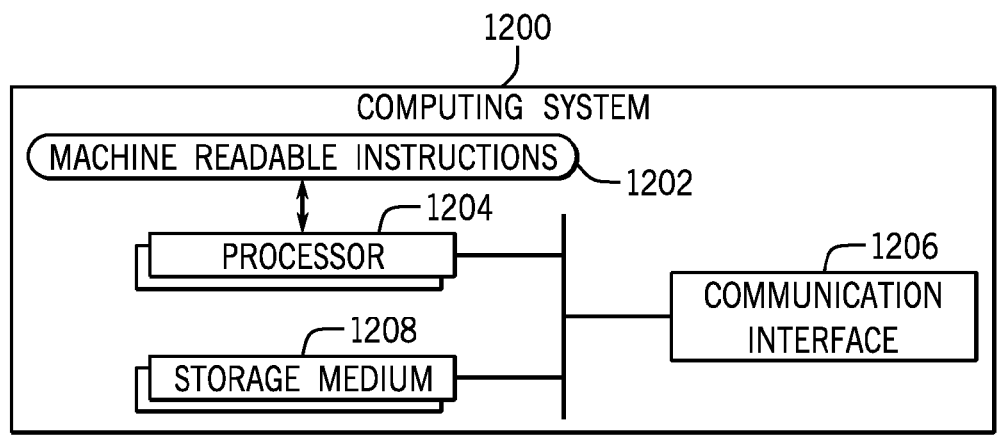
FIG. 12 is a block diagram of a system according to some implementations.

FIG. 12 depicts a computing system 1200, which can be any of the UE 110, macro eNB 126, LeNB, gateway 700, or core network node. The computing system 1200 includes machine-readable instructions 1202, which are executable on a processor (or multiple processors) 1204 to perform various tasks discussed above. A processor can include a microprocessor, microcontroller, processor module or subsystem, programmable integrated circuit, programmable gate array, or another control or computing device.

The processor(s) 1204 can be coupled to a communication interface or component 1206 to perform communications. For example, the communication component 1206 can perform wireless communicate over an air interface, or perform wired communication over a wired connection. In some cases, the computing system 1200 can include multiple communication components 1206 to communicate with respective different network nodes.

The processor(s) 1204 can also be coupled to a computer-readable or machine-readable storage medium (or storage media) 1208, for storing data and instructions. The storage medium or storage media 1208 can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:
1. A method comprising:
establishing a control plane connection over a wireless link between a user equipment (UE) and a first wireless access network node;
establishing a plurality of upper layer connections over wireless links between the UE and a set of wireless access network nodes using signaling in the control plane connection, the signaling in the control plane connection comprising control messages received by the UE from the first wireless access network node instructing the UE to establish the plurality of upper layer connections with respective protocol stacks in the UE for communicating user plane data over wireless links between the UE and the set of wireless access network nodes, each protocol stack of the protocol stacks including an independent upper protocol layer at or above a Medium Access Control (MAC) layer, wherein the set of wireless access network nodes includes at least a second wireless access network node and a third wireless access network node;
determining whether a portion of the user plane data is to be offloaded to the second wireless access network node;
sending a message to the second wireless access network node to request offloading of the portion of the user plane data to the second wireless access network node, the message comprising information identifying radio access bearers to be offloaded to the second wireless access network node; and
in response to the second wireless access network node accepting the request, sending a message in the control plane connection to the UE instructing the UE to establish an upper layer connection with the second wireless access network node.

2. The method of claim 1, wherein each protocol stack of the protocol stacks includes a respective independent MAC layer.

3. The method of claim 1, wherein at least two of the plurality of upper layer connections use a same carrier frequency or use different carrier frequencies.

4. The method of claim 1, further comprising:
communicating data over at least two of the plurality of the upper layer connections using at least two simultaneous physical layer connections.

5. The method of claim 1, wherein the UE has a transceiver to communicate data over at least two of the plurality of the upper layer connections in a time division multiplexing (TDM) manner.

6. The method of claim 1, further comprising:
communicating data packets of a bearer over at least two of the upper layer connections.

7. The method of claim 1, further comprising:
associating two different bearers with two different upper layer connections separately.

8. The method of claim 1, wherein the user plane data communicated over the upper layer connections is distributed by a data distribution entity in the first wireless access network node, the first wireless access network node separate from the second and third wireless access network nodes.

9. A first wireless access network node comprising:
a communication component to communicate with a plurality of secondary wireless access network nodes that are separate from the first wireless access network node;
at least one processor configured to:
establish a control plane connection over a wireless link with a user equipment (UE);
establish a plurality of upper layer connections using respective protocol stacks in the UE over wireless links between the UE and the secondary wireless access network nodes using signaling in the control plane connection between the first wireless access network node and the UE, each protocol stack of the protocol stacks including an independent upper protocol layer at or above a Medium Access Control (MAC) layer, the signaling comprising control messages sent by the first wireless access network node instructing the UE to establish the plurality of upper layer connections that communicate user plane data between the UE and the secondary wireless access network nodes,
determine whether a portion of the user plane data is to be offloaded to a selected one of the secondary wireless access network nodes;
send a message to the selected secondary wireless access network node to request offloading of the portion of the user plane data to the selected secondary wireless access network node, the message comprising information identifying radio access bearers to be offloaded to the selected secondary wireless access network node, and
in response to the selected secondary wireless access network node accepting the request, send a message in the control plane connection to the UE instructing the UE to establish an upper layer connection with the selected secondary wireless access network node; and
a data distribution entity to distribute the user plane data across the plurality of upper layer connections.

10. The first wireless access network node of claim 9, wherein the at least one processor is configured to:
determine whether to remove an upper layer connection between a given secondary wireless access network node of the secondary wireless access network nodes and the UE;
send a message to the given secondary wireless access network node to indicate that the given secondary wireless access network node is to no longer communicate a portion of the user plane data; and
send a message in the control plane connection to the UE instructing the UE to disconnect from the given secondary wireless access network node.

11. The first wireless access network node of claim 9, wherein the at least one processor is configured to:
route at least one bearer to the selected secondary wireless access network node.

12. A method comprising:
establishing, by a first wireless access network node, a control plane connection over a wireless link between a user equipment (UE) and the first wireless access network node;
coordinating a transmission configuration for a group of wireless access network nodes for serving the UE, wherein the group comprises two or more wireless access network nodes other than the first wireless access network node, wherein coordinating the transmission configuration further comprises assigning a group identifier to at least two of the wireless access network nodes in the group; and
controlling, by the first wireless access network node, establishment of a plurality of physical layer connections over wireless links between the UE and the group of wireless access network nodes, wherein the plurality of physical layer connections are for communicating user plane data between the UE and the group of wireless access network nodes, wherein the controlling comprises:
determining whether a portion of the user plane data is to be offloaded to a selected wireless access network node of the wireless access network nodes in the group,
sending a message to the selected wireless access network node to request offloading of the portion of the user plane data to the selected wireless access network node, the message comprising information identifying radio access bearers to be offloaded to the selected wireless access network node, and
in response to the selected wireless access network node accepting the request, sending a message in the control plane connection to the UE instructing the UE to establish an upper layer connection with the selected wireless access network node.

13. The method of claim 12, wherein coordinating the transmission configuration comprises coordinating transmission of reference signals sent by the wireless access network nodes in the group.

14. The method of claim 12, wherein the coordinating is performed by a controller selected from among a central controller integrated into the first wireless access network node, a central controller connected to the group of wireless access network nodes, and a wireless access network node in the group.

15. The method of claim 12, wherein coordinating the transmission configuration comprises configuring the wireless access network nodes in the group to send a same packet of the user plane data in a transmission time interval, or to send different packets of the user plane data in a transmission time interval.

16. The method of claim 12, wherein coordinating the transmission configuration comprises configuring the wireless access network nodes in the group so that at most one wireless network node physically transmits to the UE in a transmission time interval.

17. The method of claim 12, wherein coordinating the transmission configuration comprises configuring non-overlapping frequency resources or non-overlapping time domain resources for at least two wireless access network nodes in the group.

18. The method of claim 12, wherein coordinating the transmission configuration comprises configuring at least two component carriers so that the at least two component carriers are available for data communication.

19. The method of claim 12, wherein at least two of the plurality of physical layer connections are established in a manner transparent to the UE.

20. The method of claim 12, further comprising:
determining transmission of a first type of user plane data from one wireless access network node at a first transmission time interval to the UE, and
transmission of a second type of user plane data from another wireless access network node at a second transmission time interval to the UE.

21. The method of claim 20, wherein the first type of user plane data and the second type of user plane data have different delay requirements.

22. The method of claim 12, further comprising
controlling establishment of a physical layer connection between the UE and the first wireless access network node for communicating user plane data between the UE and the first wireless access network node.

23. The method of claim 1, wherein establishing the control plane connection comprises establishing the control plane connection using a first protocol stack of the UE, and wherein the respective protocol stacks in the UE that are used to establish the upper layer connections are separate from the first protocol stack.

24. The method of claim 12, wherein the assigning of the group identifier to the at least two of the wireless access network nodes in the group causes the at least two of the wireless access network nodes in the group to share the group identifier.

25. The method of claim 1, wherein each protocol stack of the protocol stacks includes a respective independent radio link control (RLC) layer.

26. The method of claim 25, wherein the plurality of upper layer connections are established using respective Packet Data Convergence Protocol (PDCP) layers.

* * * * *